(12) United States Patent
Ono et al.

(10) Patent No.: US 7,551,196 B2
(45) Date of Patent: Jun. 23, 2009

(54) ENDOSCOPE APPARATUS

(75) Inventors: Mitsunobu Ono, Suginami-ku (JP);
Masanao Murata, Tokorozawa (JP)

(73) Assignee: Olympus Corporation (JP)

( * ) Notice: Subject to any disclaimer, the term of this patent is extended or adjusted under 35 U.S.C. 154(b) by 826 days.

(21) Appl. No.: 11/157,291

(22) Filed: Jun. 15, 2005

(65) Prior Publication Data

US 2005/0243169 A1      Nov. 3, 2005

Related U.S. Application Data

(63) Continuation of application No. 09/496,983, filed on Feb. 2, 2000, now abandoned.

(30) Foreign Application Priority Data

Feb. 9, 1999     (JP) ................................. 11-031765

(51) Int. Cl.
*H04N 7/18* (2006.01)

(52) U.S. Cl. .............................. 348/65; 348/69; 348/68; 348/71; 348/76; 348/74; 348/77; 600/118; 600/109; 600/160; 600/117; 600/122; 600/114

(58) Field of Classification Search .................. 348/65, 348/69, 68, 71, 76, 74, 77; 600/118, 109, 600/160, 117, 122, 114
See application file for complete search history.

(56) References Cited

U.S. PATENT DOCUMENTS 4,831,444 A * 5/1989 Kato ........................... 348/518
4,845,555 A * 7/1989 Yabe et al. ..................... 348/72
5,521,639 A * 5/1996 Tomura et al. ............... 348/243
5,585,840 A * 12/1996 Watanabe et al. .............. 348/65
5,604,530 A * 2/1997 Saito et al. ..................... 348/70
5,627,583 A * 5/1997 Nakamura et al. ............. 348/72
5,913,817 A * 6/1999 Lee ............................. 600/134
6,120,435 A * 9/2000 Eino ............................. 348/65
6,397,374 B1 * 5/2002 Pasqualini ...................... 716/8

FOREIGN PATENT DOCUMENTS

| JP | 6-269404 | 9/1994 |
| JP | 9-191556 | 7/1997 |
| JP | 2694753 | 9/1997 |

\* cited by examiner

*Primary Examiner*—Shawn An
(74) *Attorney, Agent, or Firm*—Ostrolenk, Faber, Gerb & Soffen, LLP

(57) ABSTRACT

A drive signal from an SSG drives a CCD through a delay circuit and the like. An imaging signal from the CCD is converted to a video signal in a CDS circuit, which is driven by a sample hold signal given through the delay circuit, and is converted to a video signal that can be displayed on a monitor through an A/D converter circuit, a video signal processing circuit and a digital encoder to be output. Here, by correcting phases of the imaging signal and the sample hold signal, length of a signal line is corrected. Also, since the delay circuit is constructed by being incorporated in a DSP for video signal processing, which includes a video signal processing circuit and the like, the construction is simplified. Thus, the number of parts is reduced, and it can be constructed inexpensively.

10 Claims, 16 Drawing Sheets

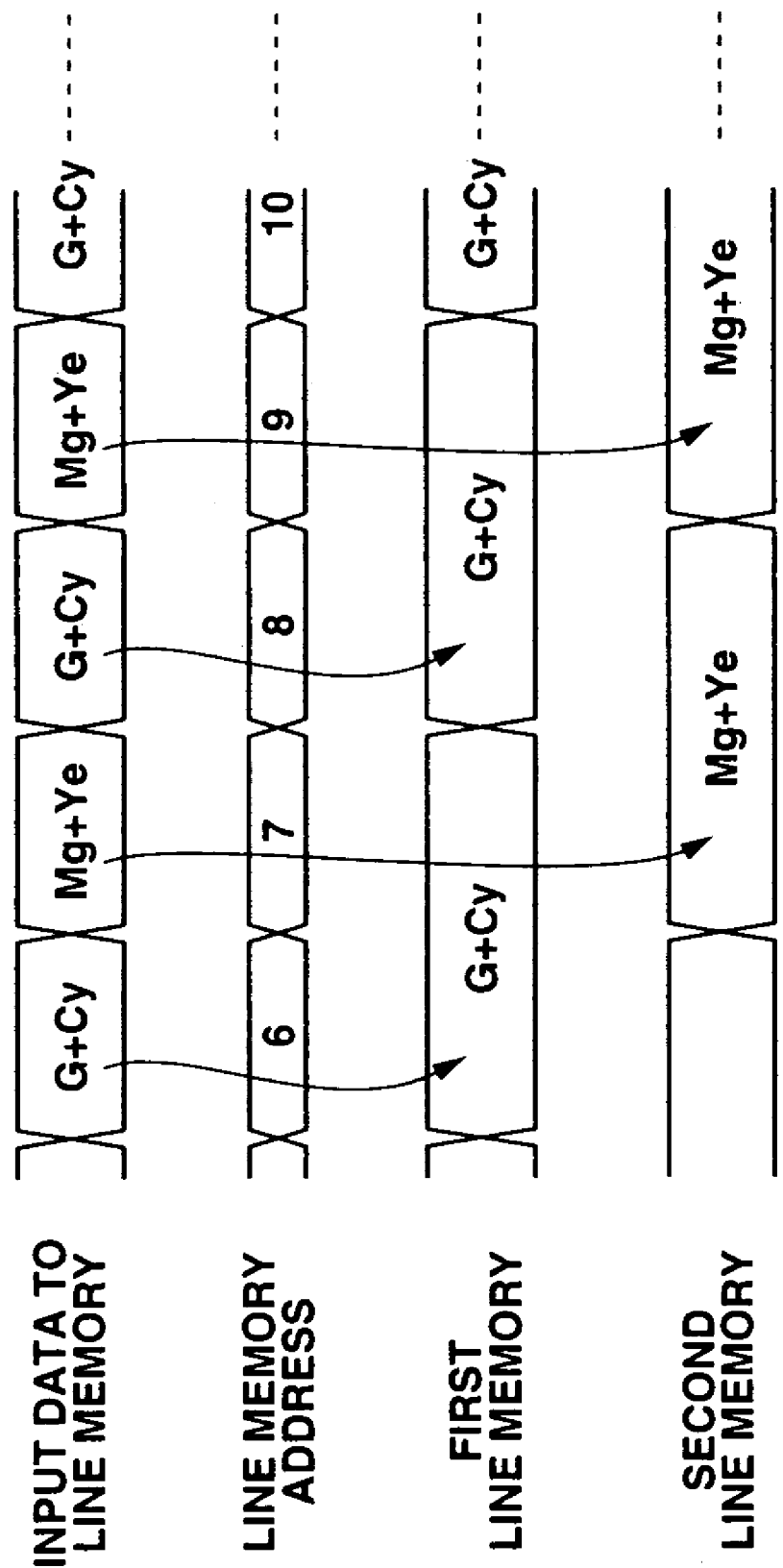

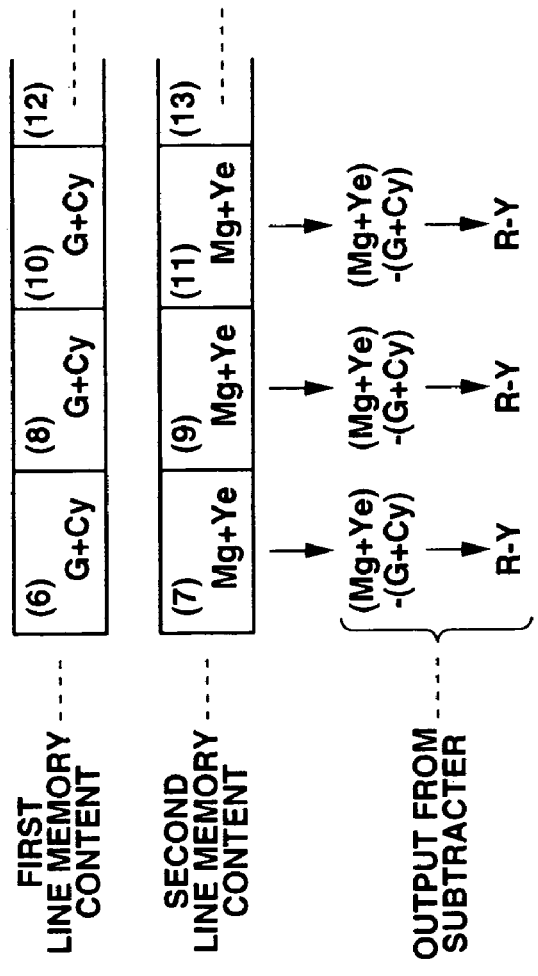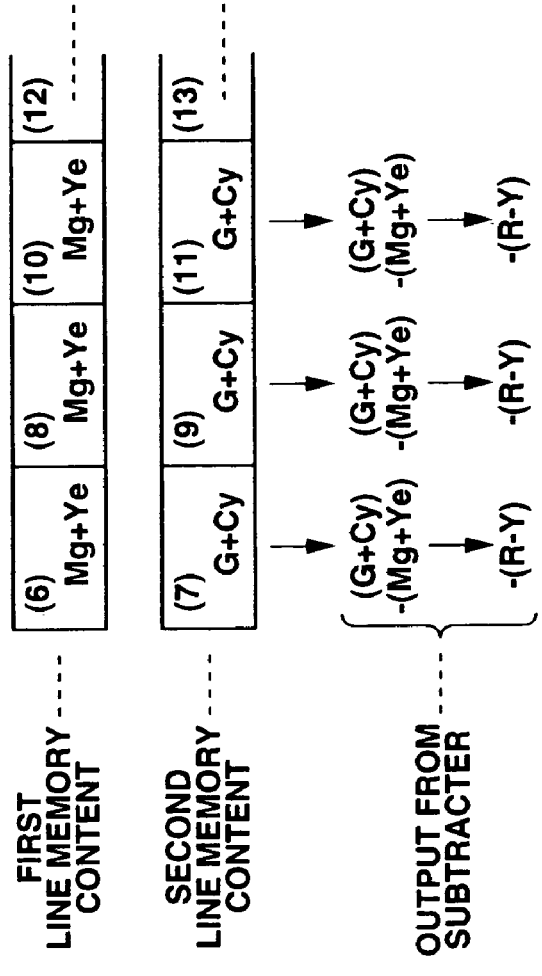
FIG.8(A)
FIG.8(B)

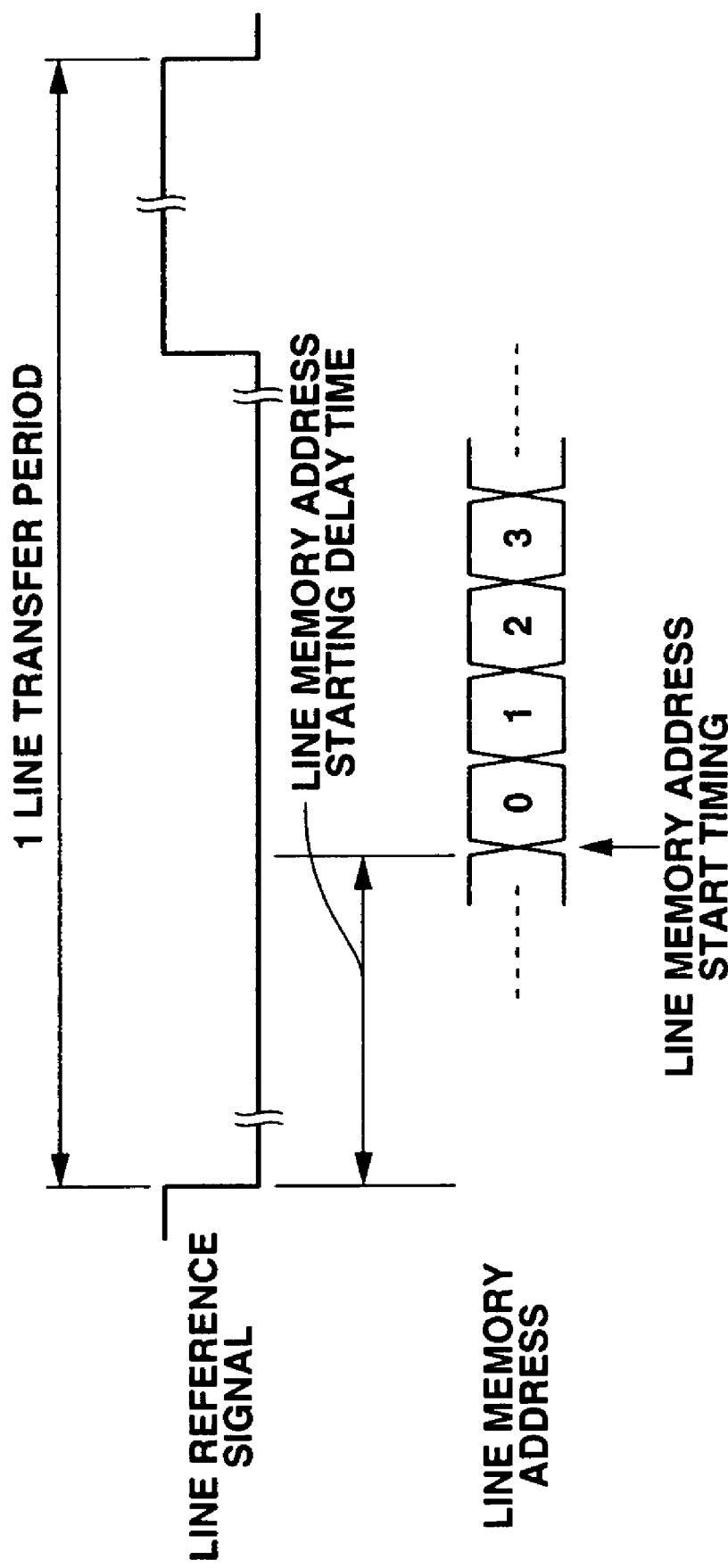

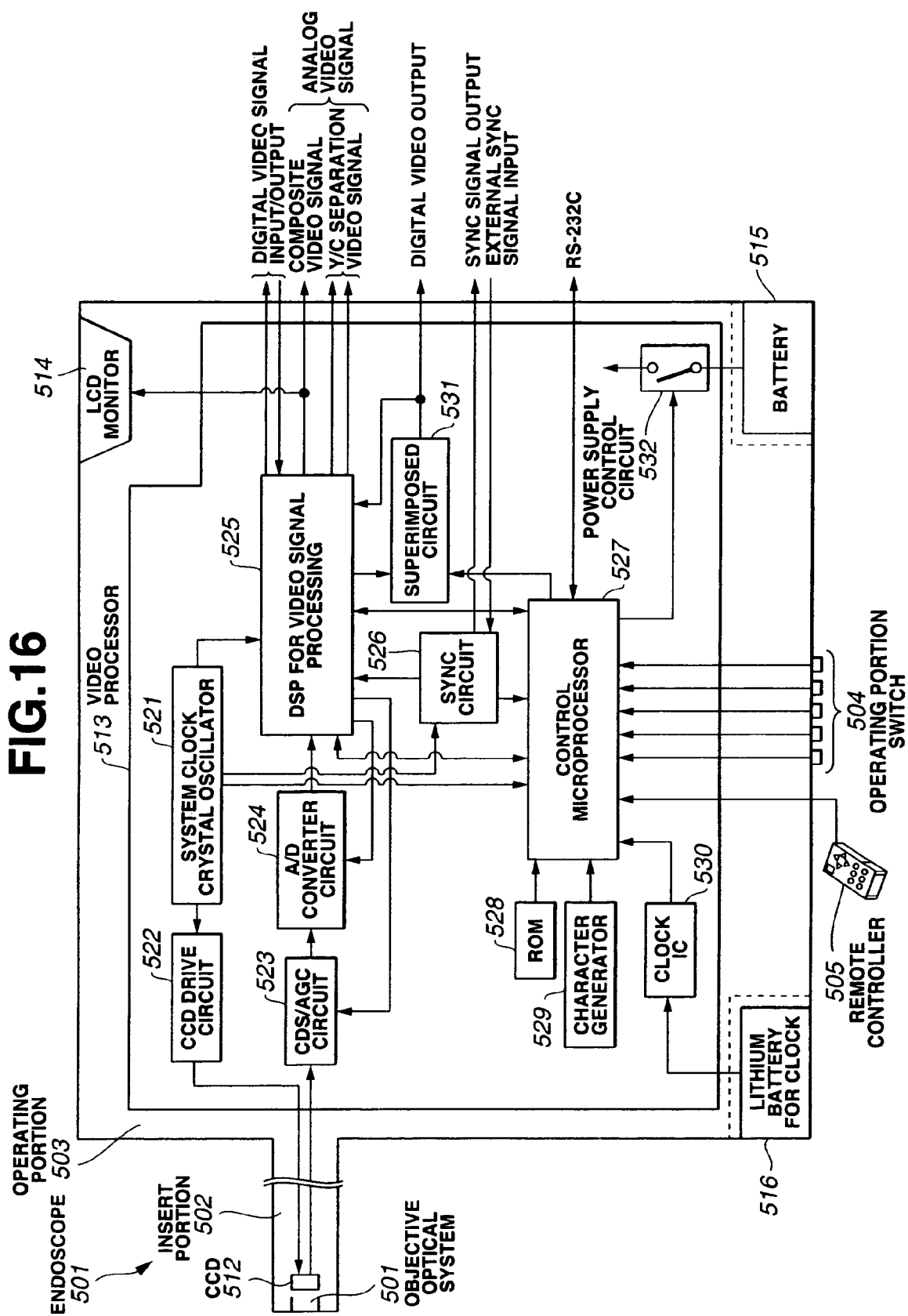

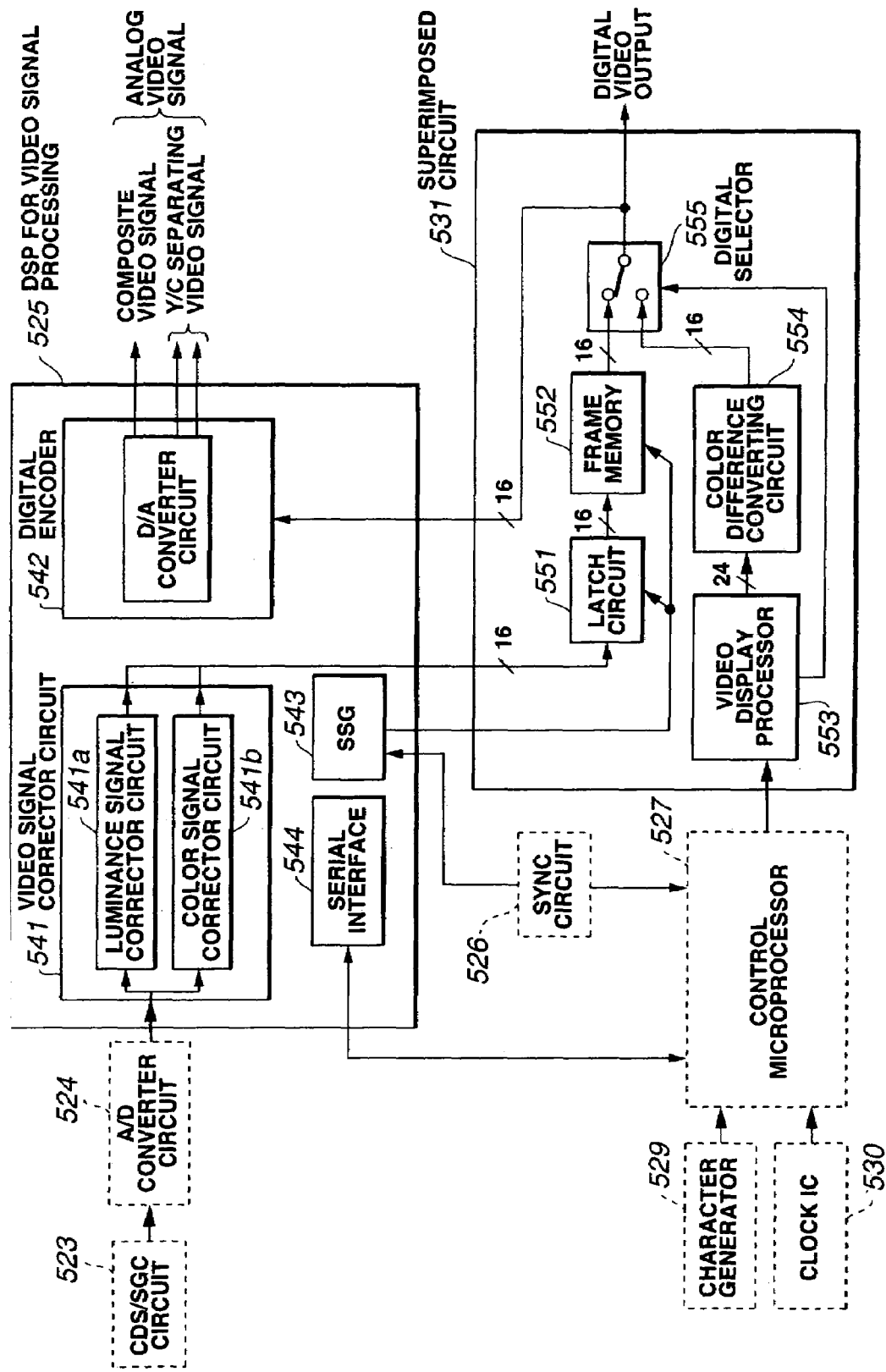

ENDOSCOPE APPARATUS

CROSS REFERENCE TO RELATED APPLICATION

This application is a continuation of U.S. application Ser. No. 09/496,983 filed Feb. 2, 2000, now abandoned entitled ENDOSCOPE APPARATUS which claims the benefit and priority of Japanese Application No. 11-031765, filed in Japan on Feb. 2, 1999, the contents of which are incorporated by this reference.

BACKGROUND OF THE INVENTION

1. Field of the Invention

The present invention relates to an endoscope apparatus, which is provided at a pointed end portion of an endoscope insert portion or whose a signal line is connected to an imaging element removably attached to an eyepiece portion in the endoscope.

2. Description of the Related Art

Recently, an endoscope is widely used whose long, narrow insert portion is inserted to within a body cavity, a duct, or the like to observe an object within the body cavity, the duct, or the like. Such an endoscope, for example, includes a CCD as an imaging means for imaging an object image at the pointed end of the insert portion. A signal line extended from the CCD is inserted through within an operating portion, which is mounted in line within the insert portion or on the side of a insert portion base end. The signal line is extended from the operating portion to be electrically connected to an external video processor. This video processor gives a drive signal to the CCD through said signal line and converts an imaging signal, obtained from the CCD through the signal line, to a video signal to picture the object on a monitor device or the like.

However, if said signal line is long, it causes delay during the drive signal and/or the imaging signal are transmitted through said signal line. Thus, within said video processor, the timing of the imaging signal received in timing with sending the drive signal is delayed, and it causes a problem that the video signal cannot be reproduced normally.

Therefore, for example, in Japanese Patent Publication carrying said Japanese Patent No. 2694753, there is disclosed a technology for correcting delay due to the length of the signal line by providing a delay line for matching phases of said CCD drive signal and a sample hold signal for sampling the imaging signal received from the CCD.

However, the conventional technology mentioned in Japanese Patent Publication carrying Japanese Patent No. 2694753 requires to add to the video processor a delay line dedicated to correcting the length of the signal line or an electrical component such as IC for signal line length correction, that is, for operating correction for the delay due to the signal line length. It causes a problem that its configuration becomes complicated, and its cost increases as the number of components increases.

SUMMARY OF THE INVENTION

In view of the forgoing, it is an object of the present invention to provide an endoscope apparatus, which can correct length of a signal line without needing the delay line dedicated to length correction of said signal line to simplify the configuration by reducing the number of components used.

An endoscope apparatus, comprises a first drive signal generator portion for generating a first drive signal for driving an imaging device built in or removably connected to an endoscope; a video signal extracting portion for obtaining a first video signal included in a imaging signal obtained in said imaging device; a second drive signal generator portion for generating a second drive signal for controlling a timing when said video signal extracting portion obtains said first video signal from said imaging signal; a first processor for storing at least part of a circuit for obtaining, from said first video signal, a second video signal that can be displayed on a monitor; and a delay circuit, which is stored in said first processor, for delaying at least part of signals among signals included in said first drive signals and said second drive signals.

Other features and advantages of the present invention will be apparent enough from the following description.

BRIEF DESCRIPTION OF THE DRAWINGS

FIG. 1 is a block diagram showing a whole configuration of the endoscope apparatus;

FIG. 2 is a block diagram showing a configuration of a delay circuit;

FIG. 4 through FIG. 9 relate to an embodiment of the endoscope apparatus for correcting color displacement in a simple configuration, and FIG. 4 is a block diagram showing a whole configuration of the endoscope apparatus;

FIG. 5 is a block diagram of a configuration of a color separator circuit;

FIG. 6 is an explanatory diagram showing correspondence between pixels and fields in the CCD;

FIG. 7 is a time chart showing data memory timing in line memories;

FIG. 8(A) shows a relationship between line memory data contents and output from a subtracter and is an explanatory diagram showing an operation when there is no cable delay;

FIG. 8(B) shoes a relationship between line memory data contents and output from a subtracter and is an explanatory diagram showing an operation when cable delay for one pixel is caused;

FIG. 9 is an explanatory diagram showing line memory address starting timings;

FIG. 10 is a block diagram showing a whole configuration;

FIG. 11 is a block diagram showing a functional configuration of the endoscope by extracting functions related to a long time exposure function;

FIG. 12 is a time chart showing an operation of the long time exposure function;

FIG. 13 is a time chart showing an operation of a dynamic range extension function;

FIG. 14 is an explanatory diagram showing an example of characteristics of correction factors used in the dynamic range extension function;

FIG. 16 and FIG. 17 relate to an embodiment of an endoscope having added functions such as a function superimposing date, time and arbitrary characters on a video signal, and FIG. 16 is a block diagram of a whole configuration of the endoscope apparatus; and FIG. 17 a block diagram showing a detailed configuration of a superimposed circuit and DSP for video signal processing.

DESCRIPTION OF THE PREFERRED EMBODIMENTS

Embodiments of the present invention will be described below with reference to the drawings.

Figure 1:
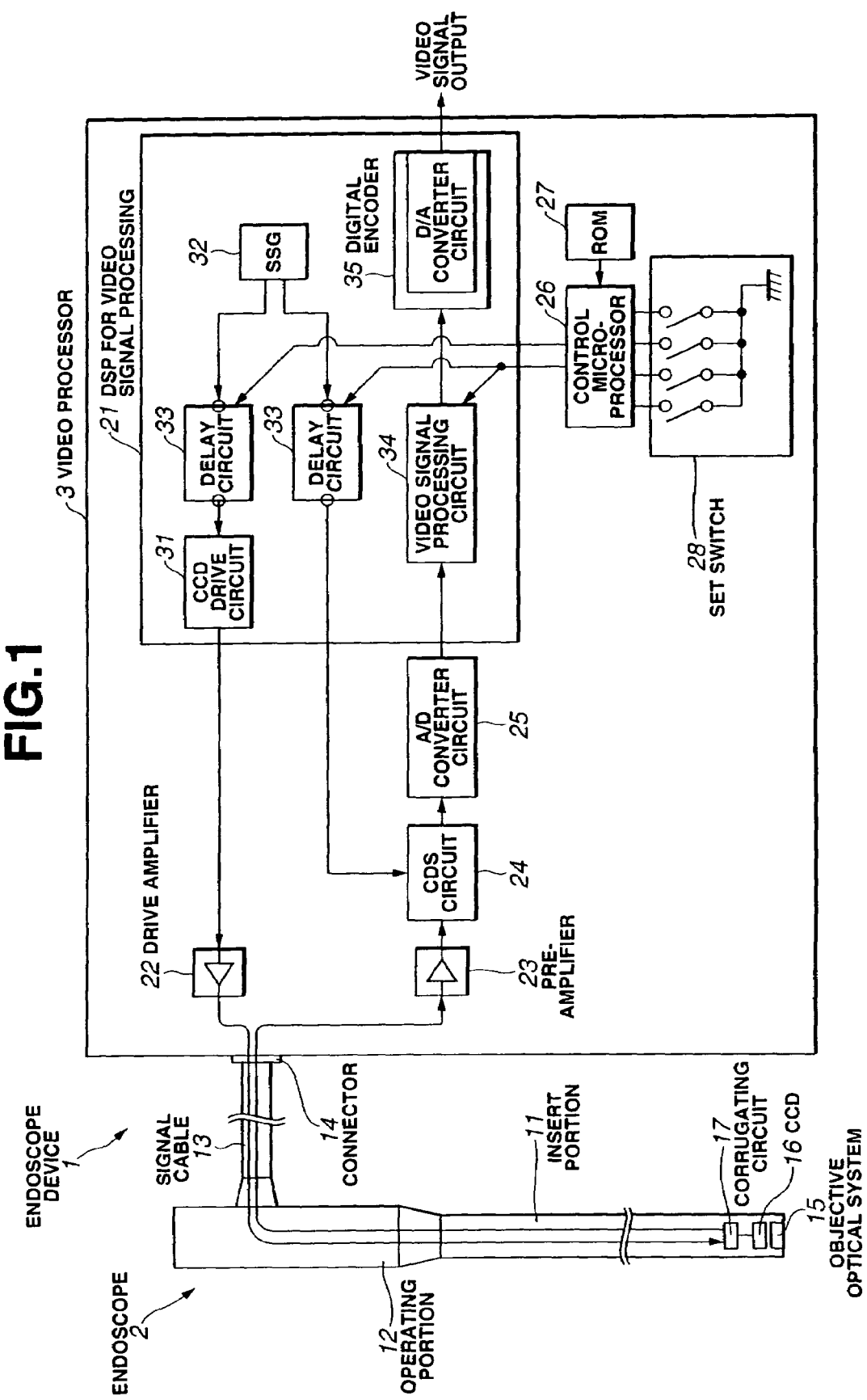
FIG. 1 and FIG. 2 relate to a first embodiment of the present invention.
Figure 2:
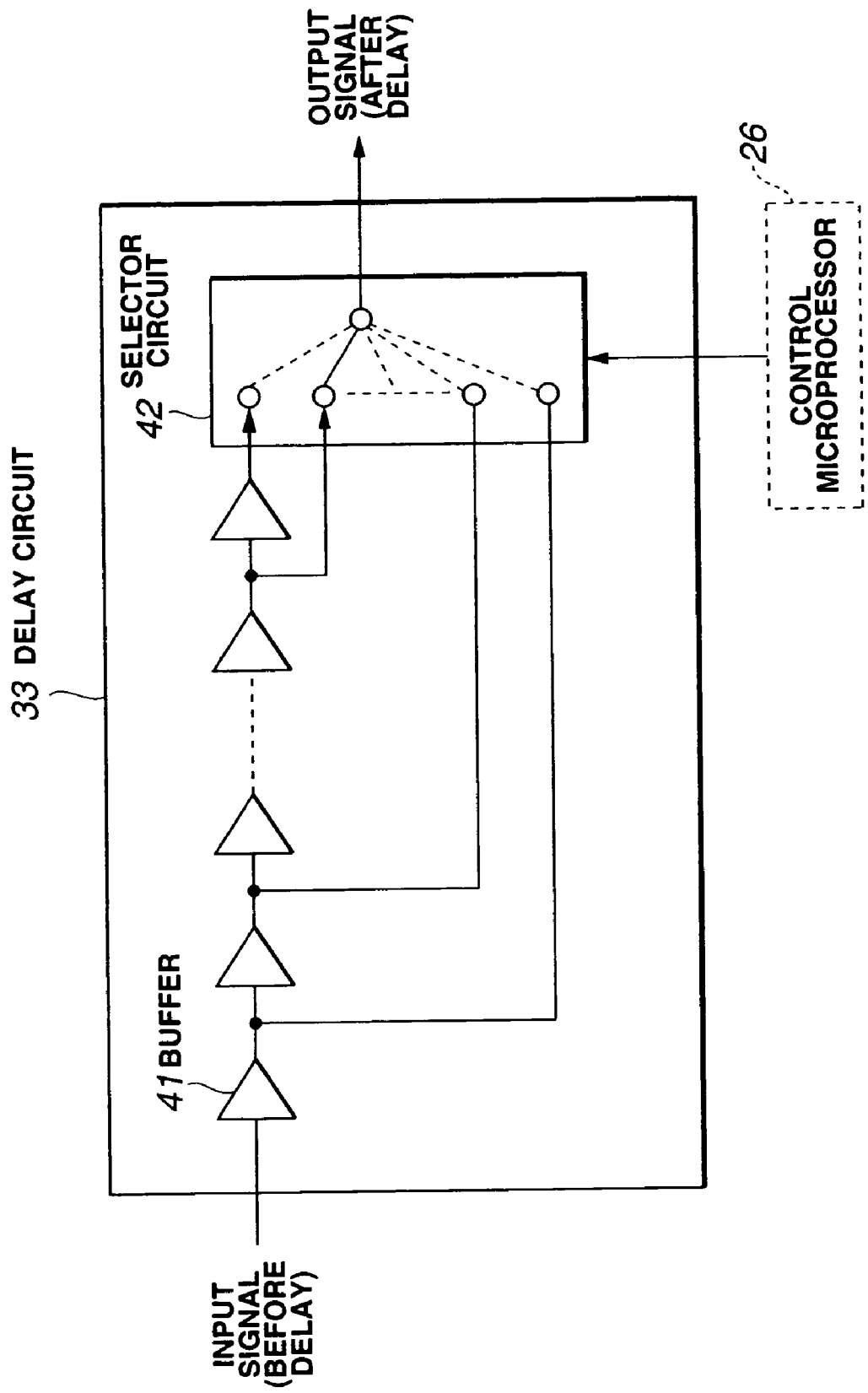

FIG. 1 and FIG. 2 relate to a first embodiment of the present invention. FIG. 1 is a block diagram showing a whole configuration of an endoscope apparatus, and FIG. 2 is a block diagram showing a configuration of a delay circuit.

As shown in FIG. 1, an endoscope apparatus 1 of this embodiment is composed of an endoscope 2, which is inserted to within a body cavity or within a duct in an equipment (duct in the followings), etc. to obtain an imaging signal which corresponds to an object image, and a video processor 3, which generates a video signal which can be displayed on a monitor from the imaging signal obtained in the endoscope 2.

Said endoscope 2 is composed of a long, narrow insert portion 11 for inserting to within a body cavity, within a duct, or the like, an operating portion 12 attached in line on the base end side of the insert portion 11 for holding and operating the endoscope 2, a signal cable 13 extended from the side part of the operating portion 12 for connection to said video processor, a connector 14 provided at the end part of the signal cable 13 for removable connection to said video processor, an objective optical system 15 provided at the pointed end of said insert portion 11 for focusing an object image, a CCD 16 whose light receiving surface is positioned at an focusing position of the objective optical system 15 as an imaging means for imaging the object image focused in the objective optical system 15, and a corrugating circuit 17 for corrugating an input/output signal from/to the CCD 16. Also, a signal line, which transmits a signal input/output to/from the CCD 16 through the corrugating circuit 17, is inserted through within the endoscope 2 to be electrically connected to said connector 14.

Said video processor 3 is composed of a DSP for video signal processing 21 (DSP stands for digital signal processor) for driving said CCD 16 or generating a video signal, a drive amplifier 22 for amplifying a drive signal, which is output from the DSP for video signal processing 21 to drive said CCD 16, a preamplifier 23 for amplifying an imaging signal transmitted from said CCD 16, a CDS circuit 24 for performing CDS (Correlated Double Sampling) processing on the imaging signal output from the preamplifier 23 to extract a video signal component, an A/D converter circuit 25 for converting the video signal obtained in the CDS circuit 24 to a digital signal to give it to said DSP for video signal processing 21, a control microprocessor 26 for controlling said DSP for video signal processing 21 and each part of the video processor 3, a ROM 27 for storing software that the control microprocessor 26 executes, and a set switch 28 for a DIP switch and the like which can detect set condition through said control micro processor 26.

Said DSP for video signal processing 21 is composed of a CCD drive circuit 31 for outputting a drive signal, for driving said CCD 16, an SSG (sync signal generator circuit) 32 for synchronously generating a drive signal to be given to said CCD drive circuit 31 and a signal such as a sample hold signal to be given to said CDS circuit 24, a delay circuit 33 for delaying each of the drive signal to be given from the SSG 32 to said CCD drive circuit 31 and the sample hold signal to be given to the CDS circuit 24, a video signal processing circuit 34 for performing each kind of video signal processing to the digital video signal obtained in said A/D converter circuit 25, and a digital encoder for digitally modulating and D/A converting the video signal output from the video signal processing circuit 34 to convert it to an analog video signal, which can be displayed on a monitor. Each kind of video signal processing includes white balance correction processing, contour enhancing processing, gamma correction and knee processing and luminance/color signal separation processing, for example.

As shown in FIG. 2, said delay circuit 33 is composed of a plurality of buffers 41, which are connected in series for delaying a signal, and a selector circuit 42 for selecting an output from each buffer 41 depending on control by said control microprocessor 26 to output. Here, the plurality of buffers 41 may be composed of connecting 100 of the buffers 41, the delay time of each of which is 1 nanosecond. Thus, the delay circuit 33 can delay the drive signal and the sample hold signal by arbitrary time length, respectively, depending on the control by the control microprocessor 26.

Next, the effect of this embodiment will be described.

The drive signal output from the SSG 32 is delayed at the delay circuit 33 and given to the CCD 16 through the CCD drive circuit 31, the drive amplifier 22, the signal cable 13 and the corrugating circuit 17. Here, the control microprocessor 26 sets the selector circuit 42 in the delay circuit 33 based on a value set at the set switch 28, and the delay circuit 33 delays the drive signal for the value set at the set switch 28.

The imaging signal obtained in the CCD 16 driven by the drive signal is given to the CDS circuit 24 through the corrugating circuit 17, the signal cable 13 and the preamplifier 13. Also, the sample hold signal output from the SSG 32 is delayed by the delay circuit 33 to be given to the CDS circuit 24. Here, the control microprocessor 26 sets the selector circuit 42 in the delay circuit 33 delays the sample hold signal for the value set at the set switch 28.

The video signal obtained in the CDS circuit 24 is converted by the A/D converter circuit 25 to a digital video signal. This digital video signal is performed each kind of video signal processing by the video signal processing circuit 34. It is converted to a video signal, which can be displayed on a monitor, to be output by the digital encoder 35.

As above, by having set the delay time of the drive signal and the sample hold signal at the set switch depending on the length of the signal cable 13, the insert portion 11, or the like, that is, depending on the length of the signal line from the CCD 16 to the video processor 3, the phases of the imaging signal and the sample hold signal input to the CDS circuit 24 are corrected, and the video processor 3 can obtain a normal video signal.

As described above, according to this embodiment, by providing the delay circuit 33, the length of said signal line can be corrected.

Also, since the delay circuit 33 is constructed by being incorporated into the DSP for video signal processing 21, the increase in the number of component for providing the delay circuit 33 can be reduced, and the endoscope apparatus 1 can be constructed inexpensively.

Therefore, according to this embodiment, by reducing the number of components, the effect can be obtained that length correction of the signal line from a CCD to a video processor can be performed in an inexpensive construction.

Also, since the delay time of the delay circuit 33 is variable with the control by the control microprocessor 26 the video processor 3 can perform the length correction by corresponding to the endoscope 2 of a plurality types in which the lengths of the signal cable 13, the insert portion 11, and the like are different, that is the length of the signal line from the CCD 16 to the video processor 3 are different.

Figure 3:
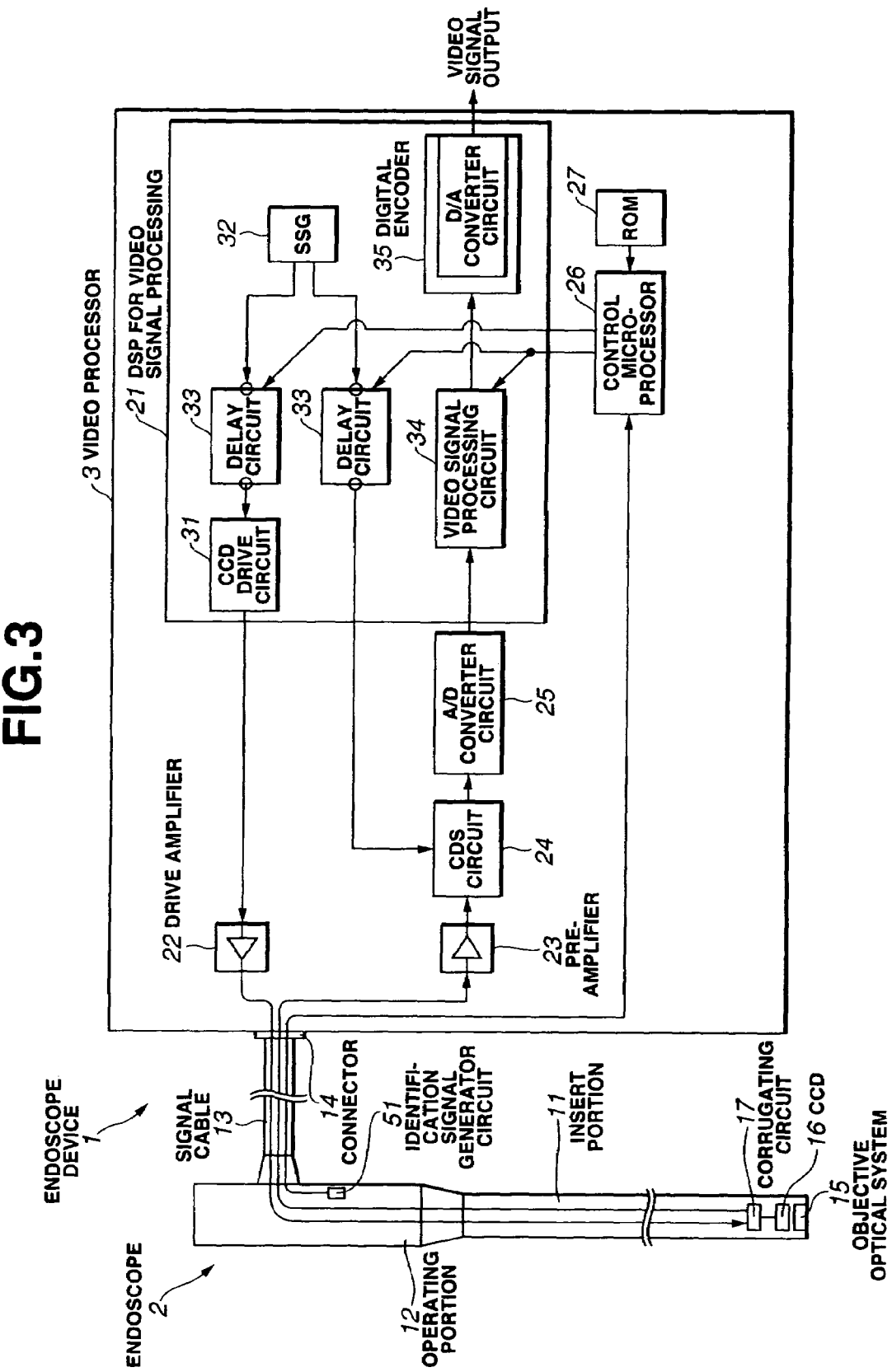
FIG. 3 relates to a modification example of the first embodiment and is a block diagram showing a whole configuration of the endoscope apparatus.

FIG. 3 relates to a modification example of the first embodiment and is a block diagram showing a whole configuration of an endoscope apparatus. In this modification example, the same number is given to the part constructed similarly to said first embodiment, and its description is omitted.

As shown in FIG. 3. in this modification example, instead of providing the set switch 28 of said first embodiment (see FIG. 1), an identification signal generator circuit 51, which gives an identification signal for identifying a type of the endoscope 2 to said control microprocessor 26, is provided in the endoscope 2. The identification signal from the identification signal generator circuit 51 is given to said control microprocessor 26 through the signal cable 13. The identification signal generator circuit may be anything which can give identification information of the endoscope 2 to said control microprocessor 26. For example, a circuit with a simple switch or a pull-up/pull-down resistance is possible.

Software for obtaining from said identification information a signal delay amount to be given to said delay circuit 33 is stored in said ROM 27. The control microprocessor 26 sets the delay circuit 33 depending on the identification information given from the identification signal generator circuit 51.

Next, operation of this modification example will be described. In this modification example, only the point, which differs from the one of said first embodiment, will be described.

When the connector 14 at the end of the signal cable of the endoscope 2 is connected to the video processor 3, an identification signal for identifying the type of the endoscope 2 is given from the identification signal generator circuit 51 to the control microprocessor 26. Then, the control microprocessor 26 automatically sets the delay time of the delay circuit 33 depending on the given identification information.

According to this modification example described above, in addition to the effect described in the first embodiment, the following effect can be obtained.

In this modification example, as the delay time of the delay circuit 33 is set automatically, its controlability is enhanced.

The present invention is not limited to the embodiments described above, and a variety of modifications are possible within the scope not departing from the principle of the invention.

For example, the ROM 27 may be other memory elements, which can store software not limiting to a mask ROM.

Also, for example, information being set at the set switch 28 may be information indicating the length of the signal line from the CCD to the video processor, not limiting to information indicating the delay time of the delay circuit 33. Here, the software for obtaining set information for the delay circuit 33 from the information indicating the length of said signal line is stored in the ROM 27.

Also, for example, the information being set at the set switch 28 may be identification information for identifying the type of the endoscope 2, not limiting to the information indicating the delay time of the delay circuit 33. Here, the software for obtaining set information for the delay circuit 33 from the identification information is stored in ROM 27.

Further, for example, information, which is given from the identification signal generator circuit 51 to the video processor 3 may be information indicating the length of the signal line from the CCD to the video processor, or information indicating the delay time to be given to the delay circuit 33, not limiting to identification information for identifying the type of the endoscope 2.

Further, the endoscope 2 may be an optical endoscope where an optical image of an object image is projected from its eyepiece portion, not limiting to an electrical endoscope including an imaging means at its insert portion pointed end. Here, the imaging means is provided at a camera head or the like, which is connected removably to the eyepiece portion. Also, the identification signal generator circuit 51 and a circuit having a similar function may be provided at the camera head, here.

As described above, recently, an endoscope apparatus is widely used, which includes the CCD, which is provided within the insert portion pointed end of the endoscope to image an object image as an imaging device, and the video processor, for driving and controlling said CCD to obtain from the imaging signal being obtained from said CCD a video signal that can be displayed on a monitor.

In such an endoscope apparatus, the video processor generally outputs a drive signal, which drives the CCD, and delay occurs in the signal line for transmitting these signals, until the imaging signal obtained in the CCD is input to the video processor. Thus, after a image signal component is extracted from the imaging signal, in the video processor, when, for example, performing color separation processing for separating a luminance component and a color difference signal component in the video signal, a wrong color difference signal is extracted, and a normal color is not reproduced in the video signal output from the video processor, caused by a gap of the timing of the pixel included in the video signal due to the delay in the signal line.

Therefore, the Japanese Unexamined Patent Publication No. 6-269404 proposes a technology for preventing the deterioration of color reproductivity caused by the delay time of signals due to the length of said signal line.

However, in the conventional technology mentioned in said Japanese Unexamined Patent Publication No. 6-269404 and the like, in order to construct a means for preventing the deterioration of color reproductivity, a delay line is provided for delaying a control signal in video signal processing to correct a phase for the delay of the imaging signal, a circuit is provided for generating a special control signal in color separation processing, or the like, which causes a drawback of the increase in the number of components and its cost.

Thus, referring to FIG. 4 through FIG. 9, an embodiment of the endoscope apparatus, which can prevent, inexpensively and in a easy construction, the deterioration of color reproductivity due to the length of said signal line will be described below.

Figure 4:
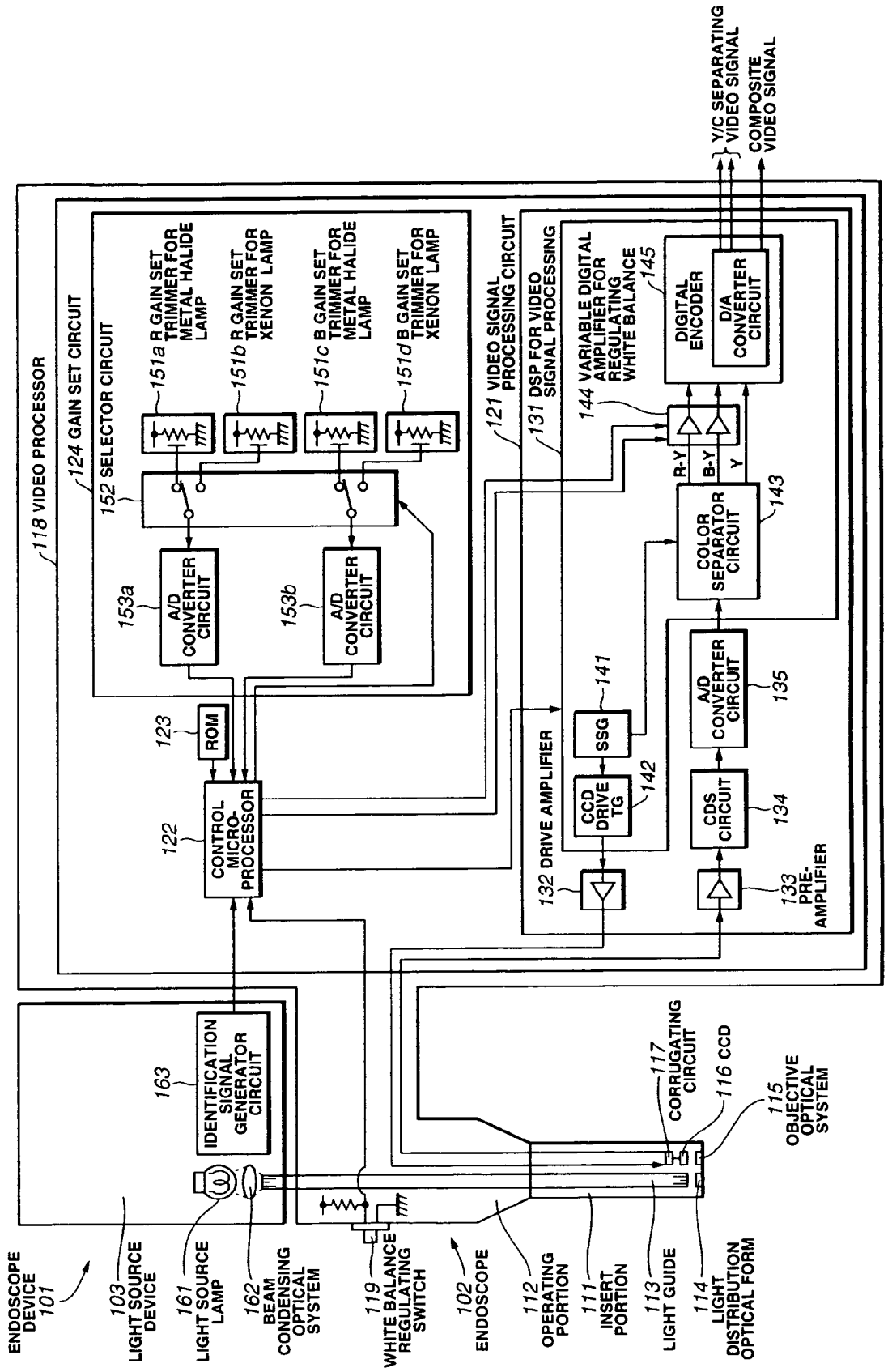

As shown in FIG. 4, an endoscope apparatus 101 is composed of an endoscope 102 for inserting to within a body cavity, a duct, or the like to observe an object image and a light source device 103, which is removably connected to the endoscope 102 for generating illuminating light to be supplied to the endoscope 102.

Said endoscope 102 is composed of a long narrow insert portion 111 for being inserted to within body cavity, a duct, or the like, an operating portion 102, which is provided in line on the base end side of the insert portion 111 for holding and operating the endoscope 112, a light guide 113 for conducting the illuminating light emitted from said light source device to the pointed end of the insert portion 111 through within said insert portion 111 and within said operating portion 112, a light distribution optical device 114, which is provided at the pointed end of said insert portion 111 for distributing the illuminating light projected from said light guide 113 toward an object, an objective optical system 115 which is provided at the pointed end of said insert portion 111 for focusing the object image, a CCD 116, whose light receiving surface is positioned at the focusing position of said objective optical system 115 at the pointed end of said insert portion 111 as an imaging means for imaging an object image, a corrugating circuit 117, which is provided near the side of the rear end of the CCD 116 for corrugating a signal that the CCD 116 inputs or outputs, a video processor 118, which is provided in said operating portion 112 and including a function for driving and controlling said CCD 116 through said corrugating circuit 117 to generate a video signal, that can be displayed on a monitor, from the imaging signal obtained in said CCD 116, and a white balance regulating switch 119 for giving to said video processor 118 a regulating value for operating white balance regulation on the video signal.

Said video processor 118 is composed of a video signal processing circuit 121, which drives and controls said CCD 116 and generates from the imaging signal obtained in said CCD 116 a video signal that can be displayed on a monitor, a control microprocessor 122, which controls each part of the video processor 118 such as said video signal processing circuit 121, a ROM 123, which stores software for executing the control microprocessor 122, and a gain set circuit 124 for setting gain information referred by said control microprocessor 122 when said control microprocessor 122 controls the gain of the video signal being processed by said video signal processing circuit 121.

Said video signal processing circuit 121 is composed of DSP for video signal processing 131 having functions for generating a drive signal for driving said CCD 116, inputting a digital video signal obtained by converting the imaging signal obtained in said CCD 116, and generating a video signal, which can be displayed on a monitor, a drive amplifier 132 for amplifying a drive signal output from the DSP for video signal processing 131 to give the drive signal to said CCD 116 through said corrugating circuit 117, a preamplifier 133 for amplifying the imaging signal obtained from said CCD 116 through said corrugating circuit 117, a CDS circuit 134 for performing CDS (correlated double sampling) processing on the imaging signal output from the preamplifier 133 to extract a video signal component, and an A/D converter circuit 135 for converting the video signal obtained in the CDS circuit 134 to a digital signal to give it to said DSP for video signal processing 131.

Said DSP for video signal processing 131 is composed of an SSG 141 (sync signal generating circuit) for synchronously generating a signal, which becomes a basis for generating the drive signal, and a signal, which becomes a basis when each part of said video signal processing circuit 121 operates, a CCD drive TG 142 (TG stands for timing generator) for generating a drive signal based on a basic signal given from the SSG 141, a color separator circuit 143, which operates by following the sync signal given from said SSG 141 and obtains a luminance signal Y and color difference signals R-Y, B-Y from the digital video signal given from said A/D converter circuit 135, a variable digital amplifier for regulating white balance 144, which is controlled by the control microprocessor 122 depending on the condition of said gain set circuit 124 and the white balance regulating switch 119, and a digital encoder 145, which performs digital modulation on the video signal consisting of the luminance signal Y input from said color separator circuit 143 and color difference signals R-Y, B-Y input from said variable digital amplifier for regulating white balance 144 for D/A converting to obtain a Y/C separating video signal and a composite video signal, which can be displayed on a monitor.

Said gain set circuit 124 is composed of an R gain set trimmer for metal halide lamp 151a for setting a gain of a red component in the video signal when a metal halide lamp is attached to said light source device 103, an R gain set trimmer for xenon lamp 151b for setting a gain of a red component in the video signal when a xenon lamp is attached to said light source device 103, a B gain set trimmer for metal halide lamp 151c for setting a gain of a blue component in the video signal when a metal halide lamp is attached to said light source device 103, a B gain set trimmer for xenon lamp 151d for setting a gain of a blue component in the video signal when a xenon lamp is attached to said light source device 103, a selector circuit 152, which is controlled by said control microprocessor 122 for selecting a gain set signal depending on the type of a lamp attached to said light source device 103, that is, for selecting the gain set signal from one combination of a combination of the R gain set trimmer for metal halide lamp 151a and the B gain set trimmer for metal halide lamp 151c and a combination of the R gain set trimmer for xenon lamp 151b and the B gain set trimmer for xenon lamp 151d, and A/D converter circuits 153a, 153b for converting set signals of the red and blue components which have passed through the selector circuit 152 to digital signals, respectively, to give them to said control microprocessor.

Said light source device 103 is composed of a light source lamp 161 such as a metal halide lamp or a xenon lamp for emitting illuminating light, a beam condensing optical system 162 for condensing the illuminating light emitted from the light source lamp 161 to project it to said light guide 113, and an identification signal generator circuit 163 for giving a signal indicating the type of said light source lamp 161 to the control microprocessor 122 for said video processor 118.

Figure 5:
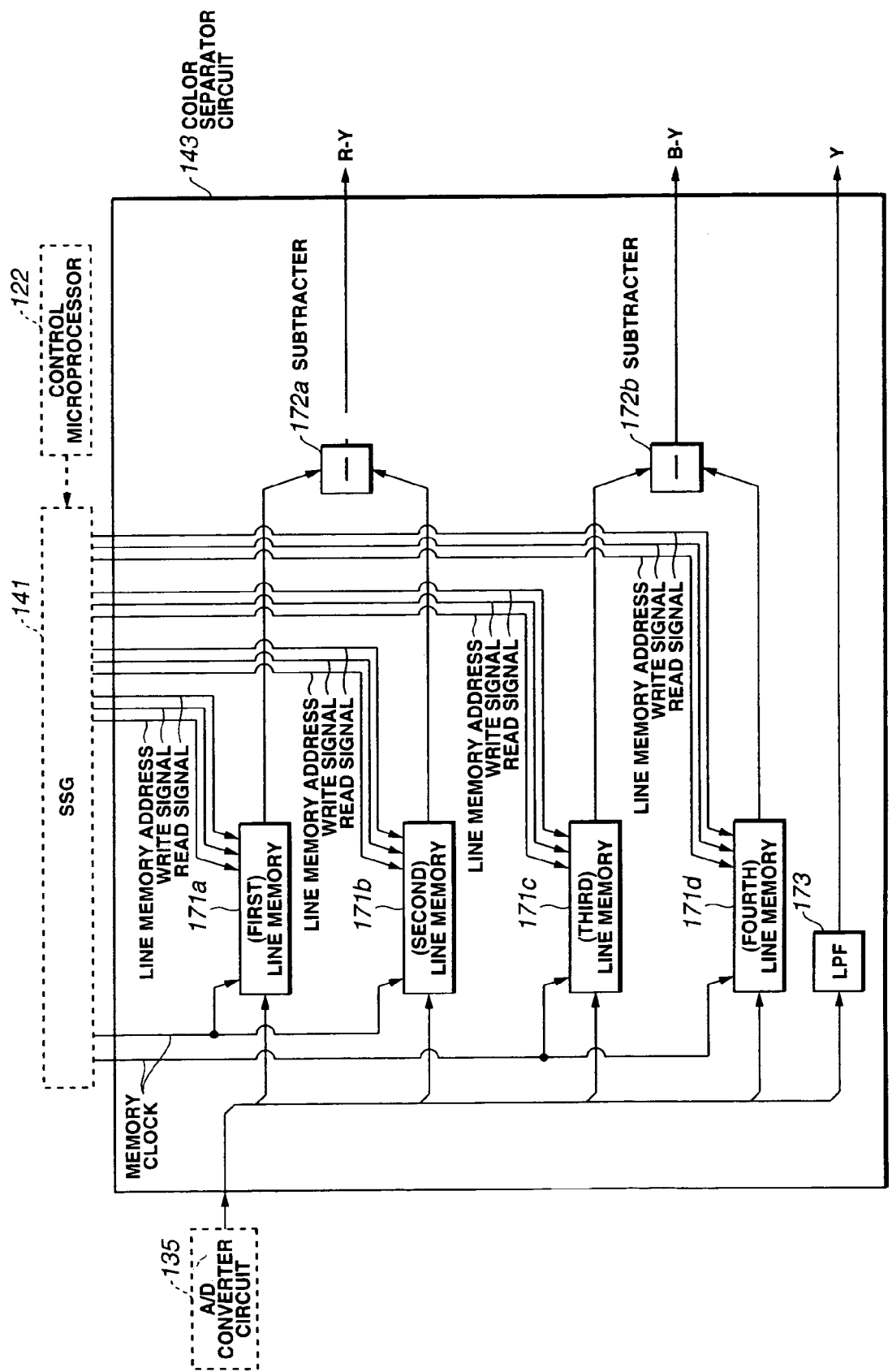

As shown in FIG. 5, the color separator circuit 143 is controlled by a memory clock, a line memory address, a write signal and a read signal, which are control signals to be given from the SSG 141, and is composed of a first line memory 171a, a second line memory 171b, a third line memory 171c, and a fourth line memory 171d for storing digital video signals successively, which is obtained through said A/D converter circuit 135, a subtractor 172a for subtracting a signal which is read out independently from said line memories 171a and 171b to obtain a color difference signal R-Y, a subtracter 172b for subtracting a signal, which is read out independently from said line memories 171c and 171d, and an LPF 173 (low pass filter), which passes a low frequency component of the digital video signal obtained in said A/D converter circuit 135 therethrough to obtain a luminance signal Y.

Next, effects related to a whole operation of an endoscope apparatus 101 shown in FIG. 4 and FIG. 5 will be described.

The illuminating light emitted from the light source lamp 161 in the light source device 103 is condensed at the beam condensing optical system 162, projected on the light incident end of the light guide 113, guided by the light guide 113, and illuminated toward an object by the light distribution optical system 114. Here, the light source lamp 161 may use a different kind of lamp, such as an arbitrary type of lamp of a metal halide lamp and a xenon lamp. If the type of light source lamp 161 differs, illuminating light with different wavelength configuration is illuminated on the object.

The object image by reflective light illuminated on the object is focused on the receiving surface of the CCD 116 through the objective optical system 115. The drive signal output from the CCD drive TG 142 in the video signal processing circuit 121 is given to the CCD 116 through the drive amplifier 132 and the corrugating circuit 117. The CCD 116 is driven by the drive signal and outputs an imaging signal, which corresponds to the object image focused on the receiving surface. The imaging signal is given to the CDS circuit 134 through the corrugating circuit 117 and the preamplifier 133. The CDS 134 extracts a video signal component from the given imaging signal to give it to A/D converter circuit 135. The A/D converter circuit 135 converts the video signal to a digital signal to give it to the color separator circuit 143. The color separator circuit 143 converts the given video signal to a luminance signal Y and color difference signals R-Y, B-Y to give the luminance signal Y to the digital encoder 145. The color difference signals R-Y, B-Y are given to the variable digital amplifier for regulating white balance 144 to regulate respective levels and, then, they are given to the digital encoder 145. The digital encoder 145 digitally modulates and D/A converts the given luminance signal Y and the color difference signals R-Y, B-Y to output a composite video signal and a Y/C separating video signal.

Next, the effect related to white balance regulation will be described.

Red and blue gain regulating values when using the metal halide lamp as the light source lamp 161 is preset to the R gain set trimmer for metal halide lamp 151a and the B gain set trimmer for metal halide lamp 151c. Similarly, red and blue gain regulating values when using the xenon lamp as the light source lamp 161 is preset to the R gain set trimmer for xenon lamp 151b and the B gain set trimmer for xenon lamp 151d.

When the light source device 103 is attached to the endoscope 102, an identification signal is given from the identification signal generator circuit 163 in the light source 103 to the control microprocessor 122. The control microprocessor 122 switches the selector circuit 165 depending on the type of the light source lamp 161 in the light source device 103 and passes a signal of either one combination of the combination of the R gain set trimmer for metal halide lamp 151a and the B gain set trimmer for metal halide lamp 151c and the combination of the R gain set trimmer for xenon lamp 151b and the B gain set trimmer for xenon lamp 151d therethrough. Then, the red and blue gain set values corresponding to the type of the light source lamp 161 is A/D converted at the A/D converter circuits 153a and 153b, respectively, to be given to the control microprocessor 122. The microprocessor 122 controls the amplification of the variable amplifier for regulating white balance 144 for each of the color difference signal R-Y, B-Y, depending on the given red and blue gain set values and the condition of the white balance regulating switch 119. The variable digital amplifier for regulating white balance 144 corrects the color difference signals R-Y, B-Y.

Next, the operation related to the color separation processing will be described.

Figure 6:
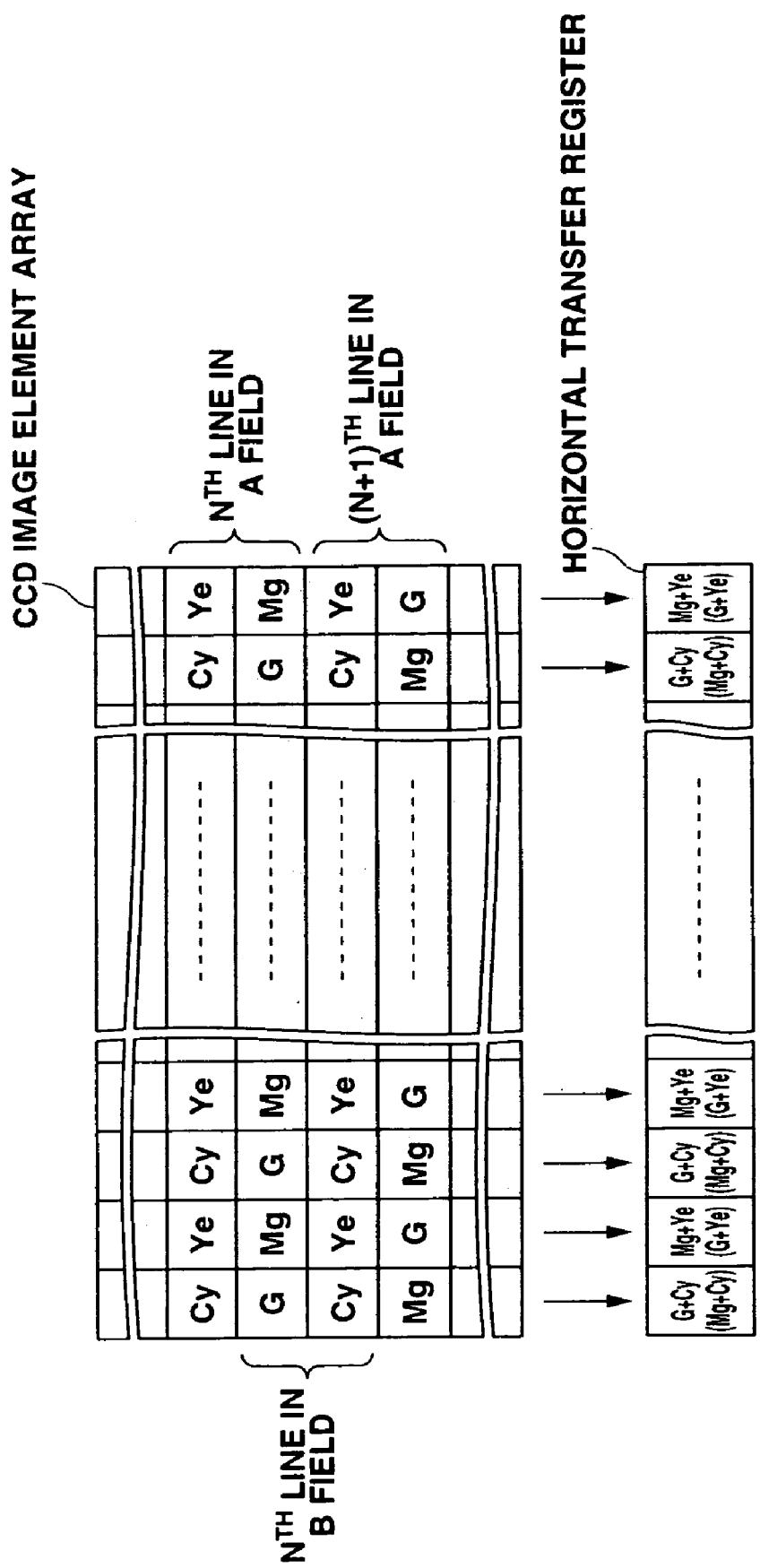

One example of pixel arrays of the CCD 116 is shown in FIG. 6. In FIG. 6, two fields composing a frame are called A field and B field for convenience. Also, "Cy" (cyan), "Ye" (yellow), "G" (green) and "Mg" (magenta) means a charge level or a signal level of a color component of each pixel. As shown in the figure, one field line is composed of two pixel line. For example, the Nth line in the A field is composed of a pixel line consisting of Cy, Ye, Cy, . . . and a pixel line consisting of G, Mg, G . . . . For the signal of the second line in the A field, signal values such as G+Cy, Mg+Ye, G+Cy, . . . are integrated in a horizontal transfer register, which is provided in the CCD 116, for integrating and transferring a signal for one field line. Also, as indicated within parenthesis in the transfer register in the figure, for the signal in the $n+1^{th}$ line in the A field, signal values such as Mg+Cy, G+Ye, Mg+Cy . . . are integrated there. The signals integrated in the horizontal transfer register are included in an imaging signal and transferred to the video signal processing circuit 121 for each field line, converted to a digital video signal and given to the color separator circuit 143 for each field line.

To line memories 171a, 171b, 171c and 171d in the color separator circuit shown in FIG. 5, a line memory address, a write signal, a read signal and a memory clock are given and controlled, respectively. Here, signals in odd number lines in each field are controlled to be stored in the first line memory 171a and the second line memory 171b, and signals in even number lines are controlled to be stored in the third line memory 171c and the fourth line memory 171d. Also, line memory addresses are corresponded to each pixel signal within each field line in order of 0, 1, 2, 3, . . . . When a line memory address is an even number, the first line memory 171a and the third line memory 171c are controlled to operate, and when it is an odd number, the second line memory 171b and the fourth line memory 171d are controlled to operate.

As shown in FIG. 7, suppose if the $n^{th}$ line in the A field is a even number line, for example, the pixel signal of the $n^{th}$ line in the A field is input to the color separator circuit 143 in order of G+Cy, Mg+Ye, G+Cy, . . . . Here, if line memory addresses of these pixel signals are 6, 7, 8, . . . , the G+Cy pixel signal is stored in the first line memory 171a, and the Mg+Ye pixel signal is stored in the second line memory 171a. Similarly, in the case of the pixel signals in odd number lines, the Mg+Cy pixel signal is stored in the third line memory 171c, and the pixel signals indicated by G+Ye is stored in the fourth line memory 171d. Also, in the B field, pixel signals are stored by the similar operation, though the color component of stored pixel signals are different.

Among pixel signals stored in each of line memories 171a and 171b, pixel signals stored in the same addresses other than the lowest bit of the address are read out simultaneously and given to the subtracter 172a. The subtracter 172a outputs a pixel signal in the level where the level of the pixel signals in the first line memory 171a is subtracted from the level of the pixel signals in the second line memory 171b. Also, among pixel signals stored in each of line memories 171c and 171d, pixel signals stored in the same addresses other than the lowest bit of the address are read out simultaneously and given to the subtracter 172b. The subtracter 172b outputs a pixel signal in the level where the level of the pixel signals in the third line memory 171c is subtracted from the level of the pixel signals in the fourth line memory 171d.

Here, it is generally known the relationship between the pixel signal and the color difference signals R-Y, B-Y, as follows:

$R-Y=(Mg+Ye)-(G+Cy)$ $B-Y=(Mg+Cy)-(G+Ye)$

Therefore, as shown in FIG. 8(A), the color difference signal R-Y is output from the subtracter 172a. In the figure, the number values indicated by (6), (7), (8) . . . indicate each line memory address. Similarly, the color difference signal B-Y is output from the subtracter 172b.

However, because of electrical delay due to the length of the signal line from the CCD to the video processor, if the phase of the imaging signal to be input to the video signal processing circuit 121 delays for one pixel, for example, the phase of the video signal to be input to the color separator circuit 143 delays for one pixel. Then, as shown in FIG. 8(B), contents of the first line memory 171a and the second line memory 171b are reversed, and the color difference signal R-Y cannot be obtained from the subtracter 172a. Similarly, the color difference signal B-Y cannot be obtained from the subtracter 172b. This is the same in the case where the phase of the video signal delays for an odd number pixel. Thus, it deteriorates the color reproductivity of the video signal output from the digital encoder 145.

The SSG 141, therefore, controls the operation of the color separator circuit 143, as described below. That is, for the reference timing of rise, for example, of a line reference signal indicating one line transfer period, the SSG 141 delays the line memory address starting timing to control it to output the line memory address to the color separator circuit 143. Here, the line memory address starting delay time is set depending on the delay of the phase of the imaging signal. By this, even when the phase of the video signal to be given to the color separator circuit 143 delays for an odd number pixel, the line memory address start timing can be adjusted, and correct color difference signals R-Y, B-Y are output from the color separator circuit 143 to maintain the reproductivity of the video signal output from the digital encoder 145.

As described above, the endoscope apparatus 101 according to this embodiment can prevent the deterioration of the reproductivity of the output video signal.

Also, the deterioration of the color reproductivity can be prevented by the easy configuration, which only delays the start timing of the line memory address to be given from the SSG 141 to the color separator circuit 143.

Further, since the SSG 141 is constructed within the DSP for video signal processing 131, and the deterioration of the color reproductivity for each kind of the endoscope 102 can be prevented by processing such as changing the contents of a memory element such as ROM, not shown, for storing software that the DSP for video signal processing 131 executes, additional parts can be reduced, which can reduce its cost.

Therefore, according to the endoscope apparatus 101 of this embodiment, the deterioration of the color reproductivity can be prevented by the easy configuration and inexpensively.

Further, since the gain for each of color signals R-Y, B-Y is adjusted automatically depending on the type of the light source lamp 161, the deterioration of the color reproductivity caused by using different kinds of light source lamps 161 can be prevented. Though, in the example of the endoscope apparatus 101 shown in FIG. 4, the gains for color difference signals R-Y, B-Y are set at the R gain set trimmer for metal halide lamp 151a, the R gain set trimmer for xenon lamp 151b, the B trimmer gain set trimmer for metal halide lamp 151c and the B gain set trimmer fir xenon lamp 151d, it is not limited to such a configuration, and the gain value can be stored in the ROM 123 connected to the control microprocessor 122. Then, the gain value can be selected by the control microprocessor 122 to be set. Furthermore, by providing a communication line with the outside, not shown, and connecting a PC (personal computer), for example, through the communication line, the gains for color difference signals R-Y, B-Y can be set from the PC.

Though, in the endoscope apparatus 101 shown in FIG. 4, the video processor 118 is constructed integrally with the endoscope 102, it is not limited to such a configuration, and the video processor can be constructed separately from the endoscope.

Figure 15:
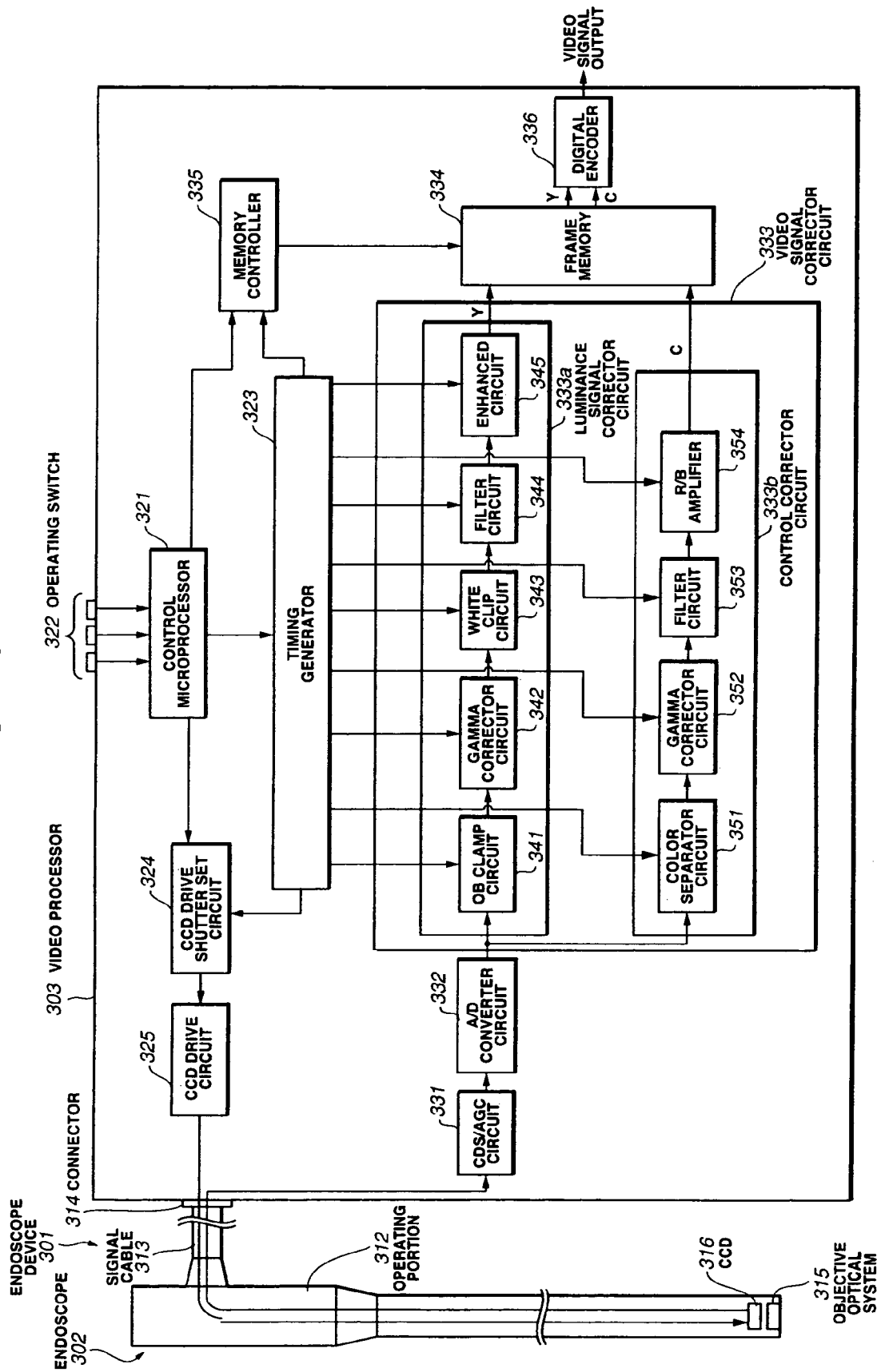
FIG. 15 is a block diagram showing a configuration of the endoscope apparatus.

By the way, recently, an endoscope is widely used whose long, narrow insert portion is inserted to within a body cavity, a duct, or the like to observe an object within the body cavity, the duct, or the like, and such an endoscope apparatus is generally configured as shown in FIG. 15, for example.

An endoscope apparatus 301 shown in FIG. 15 is composed of an endoscope 302, which is inserted to within a body cavity, within a duct, or the like to obtain an imaging signal which corresponds to a object image, and a video processor 303, which obtains a video signal which can be displayed on a monitor from the imaging signal being obtained by the endoscope 302.

Said endoscope 302 is composed of a long, narrow insert portion 311 for inserting to within a body cavity, within a duct, or the like, an operating portion 312 installed in line on the base end side of the insert portion 311 for holding and operating the endoscope 302, a signal cable 313 extended from the side part of the operating portion 312 for transmitting a signal to the video processor 303, a connector 314 provided at the end part of the signal cable 313 and connected removably to said video processor 303, an objective optical system 315 provided at the pointed end of said insert portion 311 for focusing an object image, a CCD 316, which is provided as an imaging means for imaging the object image focused in the objective optical system 315.

Said video processor 303 is composed of a control microprocessor 321 for controlling each part of the video processor 303, an operating switch 322 connected to said control microprocessor 321 for operating the video processor 303, a timing generator 323 for generating a control signal to be given to each part of the video processor 303, a CCD drive/shutter set circuit 324 having a function, which controls a electrical shutter function of the CCD 315, and generating a drive signal of the CCD 315, a CCD drive circuit 325 for amplifying the drive signal generated at the CCD drive/shutter circuit 324 to gives it to said CCD 316, a CDS/AGC circuit 331 for performing CDS (correlated double sampling) processing and AGC (Automatic gain control) processing on the imaging signal obtained in said CCD 316 to extract a video signal component, an A/D converter circuit 332 for converting the video signal obtained in the CDS/AGC circuit 331 to a digital signal, a video signal corrector circuit 333 for performing correction processing and the like on the video signal obtained in the A/D converter circuit 332 to obtain a video signal consisting of a luminance signal and a color signal, a frame memory 334 for temporally storing a video signal obtained in the video signal corrector circuit 333, a memory controller 335 for controlling the frame memory 334, and a digital encoder 336 for digitally modulating and then D/A converting the video signal from said frame memory 334 to obtain a video signal, which can be displayed on a monitor.

Said video signal corrector circuit 333 is composed of a luminance signal corrector circuit 333a, which includes an OB (optical black) clamp circuit 314, a gamma corrector circuit 342, a white clip circuit 343, a filter circuit 344 and an enhanced circuit 345, for example for performing correction processing and the like on the luminance signal component of the video signal, and a color signal corrector circuit 333b, which includes a color separator circuit 351, a color gamma corrector circuit 352, a filter circuit 353 and an R/B amplifier 354 for amplifying a red component and a blue component independently, for performing correction processing and the like on the color signal component.

However, in a conventional endoscope apparatus such as the endoscope apparatus 301, when executing processing in a special operating mode such as a long time exposure mode, in which the operation is done by extending the exposure time, or a dynamic range extension mode, in which the operation is done by extending the dynamic range of the video signal, it conventionally causes the increase in cost since it adds a circuit for generating a control signal or a circuit for performing operation processing of the video signal.

Thus, an embodiment of an endoscope, which can operate by switching the special operating mode such as the long time exposure mode and the dynamic range extension mode, while reducing additional hardware will be described with reference to FIG. 10 through FIG. 14.

Figure 10:
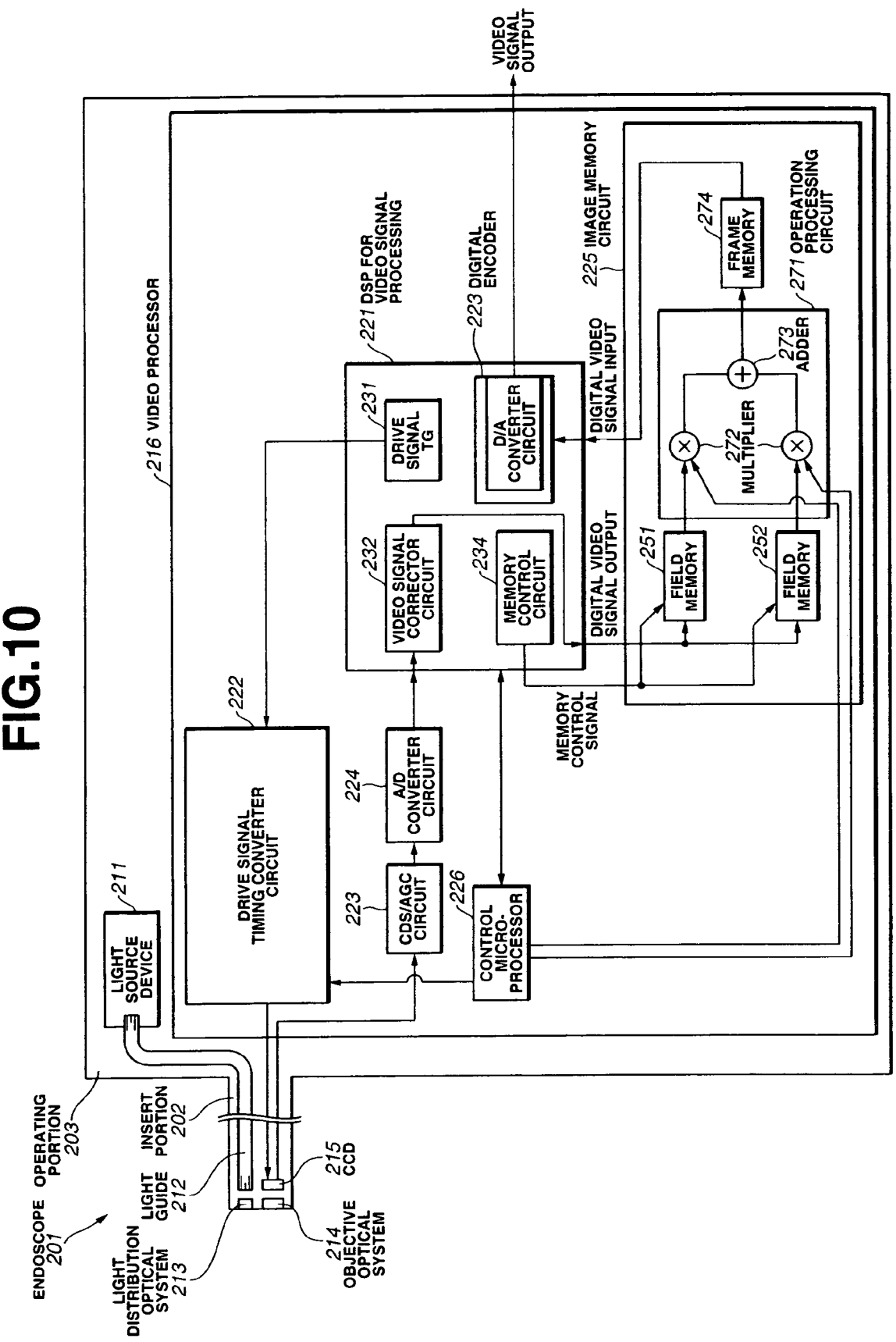
FIG. 10 through FIG. 14 are embodiments of an endoscope in which a special effect function is added to a video signal processing function in an inexpensive configuration.

As shown in FIG. 10. an endoscope 201 is composed of an insert portion 202 for being inserted to within a body cavity, a duct, or the like, an operating portion 203, which is provided in line on the base end side of the insert portion 202 for holding and operating the endoscope 201, light source device 211, which is provided in said operating portion 203 for supplying illuminating light, a light guide 212 for conducting the illuminating light emitted from said light source device 211 to the pointed end of said insert portion 202 through within said operating portion 203 and said insert portion 202, a light distribution optical device 213, which is provided at the pointed end of said insert portion 202 for distributing the illuminating light projected from said light guide 212 toward an object, an objective optical system 214, which is provided at the pointed end of said insert portion 202 for focusing the object image, a CCD 215, whose light receiving surface is positioned at an focusing position of the objective optical system 214 at the pointed end of said insert portion 202 as an imaging means for imaging an object image focused in said objective optical system 214, and a video processor 216, which is provided in said operating portion 203, for example, and driving and controlling said CCD 215 to obtain a video signal, that can be displayed on a monitor, from an imaging signal obtained in said CCD 215.

Said video signal processing circuit 216 is composed of DSP for video signal processing 221 (DSP stands for digital signal processor) for generating a drive signal for driving said CCD 215, and converting the digital video signal obtained from the imaging signal obtained in said CCD 215 to a video signal, which can be displayed on a monitor, a drive signal timing converter circuit 222 for converting a timing of the drive signal output from the DSP for video signal processing 221 to give it to said CCD 215, a CDS/AGC circuit 223 for performing CDS (Correlated double sampling) processing and AGC (automatic gain control) processing on the imaging signal obtained in said CCD 215 to extract a video signal component, an A/D converter circuit 224 for converting the video signal obtained in the CDS/AGC circuit 223 to a digital signal to give it to said DSP for video signal processing 221, an image memory circuit 225 for temporally storing the digital video signal in the middle of the processing by said DSP for video signal processing 221, performing specified operation processing and the like and returning the video signal to said DSP for video signal processing 221, and a control microprocessor 226 for transmitting information to said DSP for video signal processing 221 while controlling each part of the video processor 216 such as said drive signal timing converter circuit 222 and said image memory circuit 225.

Said DSP 221 is composed of a drive signal TG 231 (TG stands for timing generator) for generating a drive signal for driving said CCD 215 to give it to said drive signal timing converter circuit 222, a video signal corrector circuit 232 for operating correction processing and the like on the video signal obtained in said A/D converter circuit 224 to give the video signal to said image memory circuit 225, a digital encoder 233 for performing digital modulation and D/A conversion on the video signal returned from said image memory circuit 225 to obtain a video signal, which can be displayed on a monitor, and a memory control circuit 234 for generating a memory control signal to be given to said image memory circuit 225.

Said image memory circuit 225 is composed of a field memory 251 for successively storing a video signal in the A field among video signals composed of two fields called A field and B field for convenience, a field memory 252 for storing successively the video signal in the B field, an operation processing circuit 271 for performing operation processing and the like on video signal data read out from said field memories 251 and 252, depending on the control from said control microprocessor 226, and a frame memory 274 for storing temporally a video signal output from the operation processing circuit 271 and returning the video signal to said DSP fir video signal processing 221.

Said operation processing circuit 271 is composed of two multipliers 272 for multiplying each of the video signal data read out from said field memories 251 and 252 by a factor given by said control microprocessor 226, and an adder 273 for adding the video signal data output from these two multipliers 272.

Next, effect related to general operations by the endoscope 201 will be described.

The illuminating light emitted from the light source device 211 is conducted by the light guide 212 and illuminated toward an object by the light distribution optical system 213.

An optical image of the object to which the illuminating light is illuminated is focused on the light receiving surface of the CCD 215 by the objective optical system 214, and the CCD 215 images the object image. The drive signal generated in the drive signal TG 231 is given to the CCD 215 without timing conversion in the drive signal timing converter circuit 222 generally, The CCD 215 driven by the drive signal gives the imaging signal to the CDS/AGC circuit 223. The CDS/AGC circuit 223 extracts the video signal component from the given imaging signal and gives it to the A/D converter circuit 224. The A/D converter circuit 224 converts the given video signal to a digital signal and give it to the DSP for video signal processing 221. In the DSP for video signal processing 221, correction processing and the like are performed on the given video signal by the video signal corrector circuit 232 and give it as a digital video signal output in form of "Y:U:V=4:2:2", for example, to the image memory circuit 225. In the image memory circuit 225, the given video signal is temporally stored in the field memories 251 and 252 and is generally returned to the DSP for video signal processing 221 through the frame memory 274 as it is as a digital video signal without being performed the processing in the operation processing circuit 271. In the DSP for video signal processing 221, the returned video signal is converted to a video signal, which can be displayed on a monitor, by the digital encoder 233, to output. Here, the field memory 251 is controlled by a memory control signal from the memory control circuit 234 of the DSP for video signal processing 221, while the operation mode of the drive signal timing converter circuit 222 and the operation processing circuit is controlled by the control microprocessor 226.

In the endoscope 201, the memory control circuit 234 controls the field memories 251 and 252 or the control microprocessor 226 controls the operation mode of the drive signal timing converter circuit 222 and the operation processing circuit 271 so that it can operate in a long time exposure mode, described below, in which it operates by making the exposure time of the CCD 215 longer than usual, and in a dynamic range extension mode, described below, in which it operates by extending the dynamic range of the video signal obtained from the imaging signal obtained in the CCD 215, in addition to the usual operation mode described above.

Next, effect related to the operation in the long time exposure mode will be described.

Figure 11:
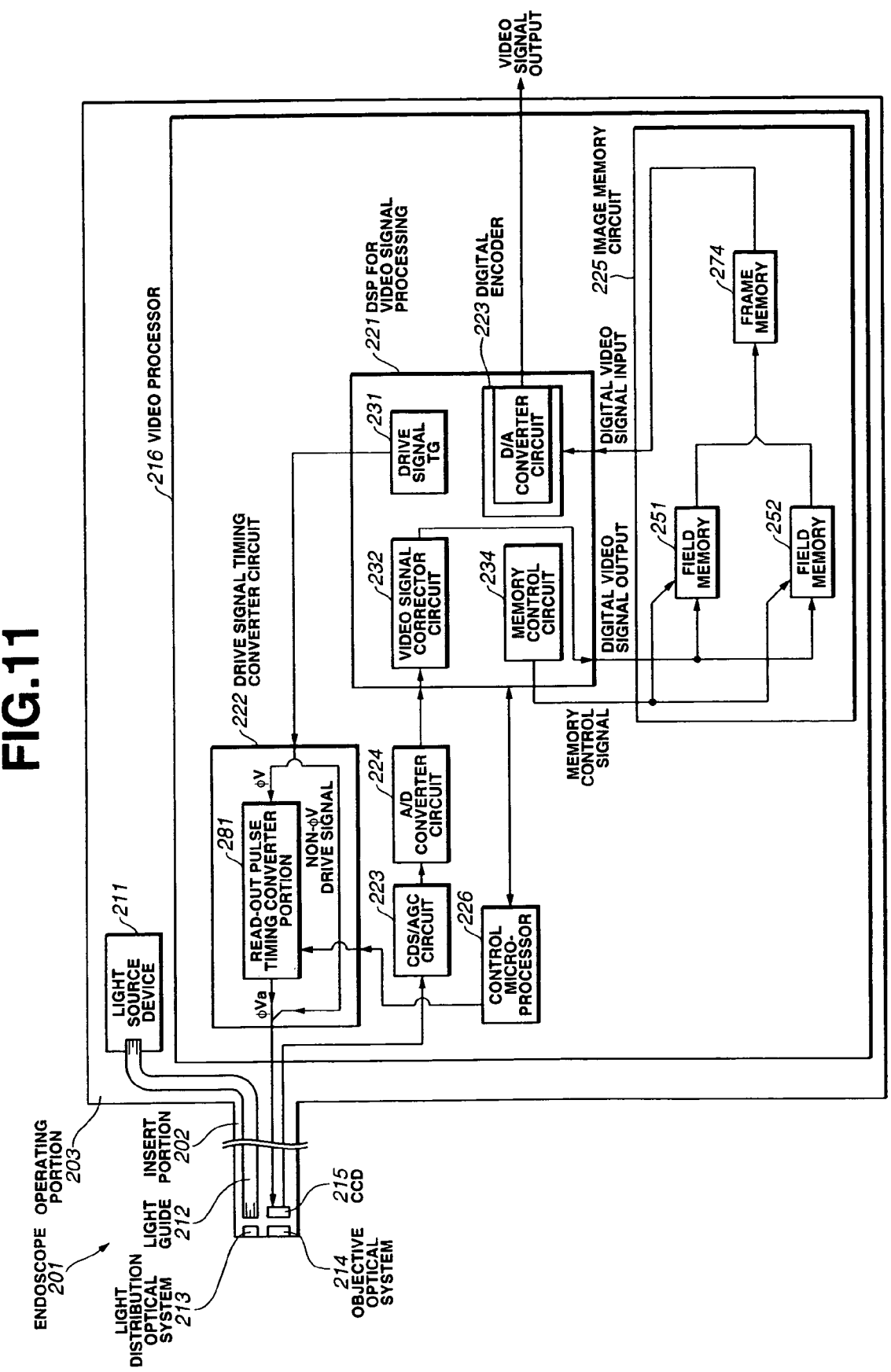

The endoscope 201 configured as shown in FIG. 10 is equivalent to the functional configuration shown in FIG. 1 when it is in the long time exposure mode. That is, as shown in FIG. 11, in the drive signal timing converter circuit 222, since timing of vertical transfer signals φV of the drive signals is converted while timing of the other drive signals is not converted, the drive signal timing converter circuit 222 functionally includes a read-out pulse timing converter portion 281, which is configured to convert the timing of the vertical transfer signals φV but to pass the other drive signals as they are. Also, since the processing by the operation processing is not performed in the image memory circuit 225, the image memory circuit 225 is functionally configured such that the video signals from the field memories 251 and 252 are returned to the DSP for video signal processing as they are through the frame memory 274, not passing through the operation processing circuit 271.

In FIG. 11, the same number is given to the same part as those shown in FIG. 10.

Figure 12:
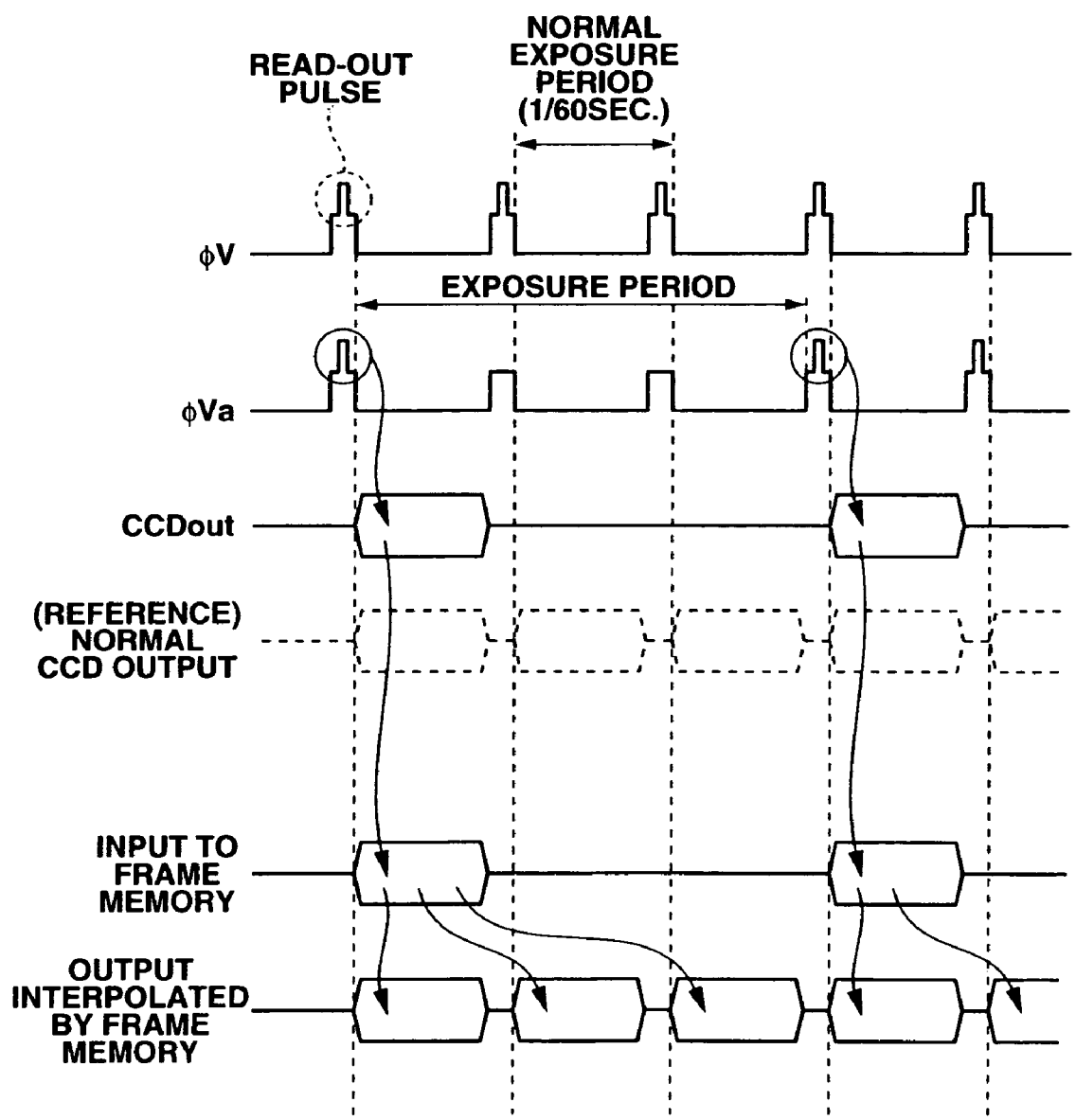

As shown in FIG. 12, the vertical transfer signals φV output from the DSP for video signal processing 221 consists of vertical transfer pulses at a cycle of 1/60 sec., for example, which gives timing for when the CCD 215 transfers the signals in one field line of the CCD 215 to a transfer register, not shown, built in the CCD 215. Generally, read-out pulses, which gives timing by which the CCD 215 outputs one field line signal including imaging signal is superimposed on the vertical transfer pulses.

The read out pulse timing converter portion 281 outputs vertical transfer signals φVa, which are converted from the vertical transfer signals φV so as to thin out read-out pulses included in the vertical transfer signals φV. The read-out pulses occur at a cycle of 1/60 sec. generally. However, since, in the example shown in the figure, the read-out pulses occur once during when the vertical transfer pulses occur three times, the read-out pulses occur once in 1/20 sec. Therefore, as the cycle of the read-out pulses becomes longer, the exposure period of the CCD 215 becomes longer.

Thus, while the imaging signals are output from the CCD 215 at a cycle of 1/60 sec. generally, the imaging signals CCDout are output at a cycle of 1/20 sec. for example, in the long time exposure mode. These imaging signals CCDout are converted to the video signals and given to the image memory circuit 225. In the image memory circuit 225, the given video signals are interpolated by the field memories 251, 252 and the frame memory 274 controlled by the memory control circuit 234, and the interpolated video signals are returned to the DSP for video signal processing 221.

Next the effect related to the operation of the dynamic range extension mode will be described.

In the dynamic range extension mode, the drive signal timing converter circuit 222 converts the timing of electrical shutter signals SUB, for controlling an electrical shutter function of the CCD 215, among drive signals, but does not convert the timing of the other drive signals. Also, in the image memory circuit 225, operation processing is performed by the operation processing circuit 271.

Figure 13:
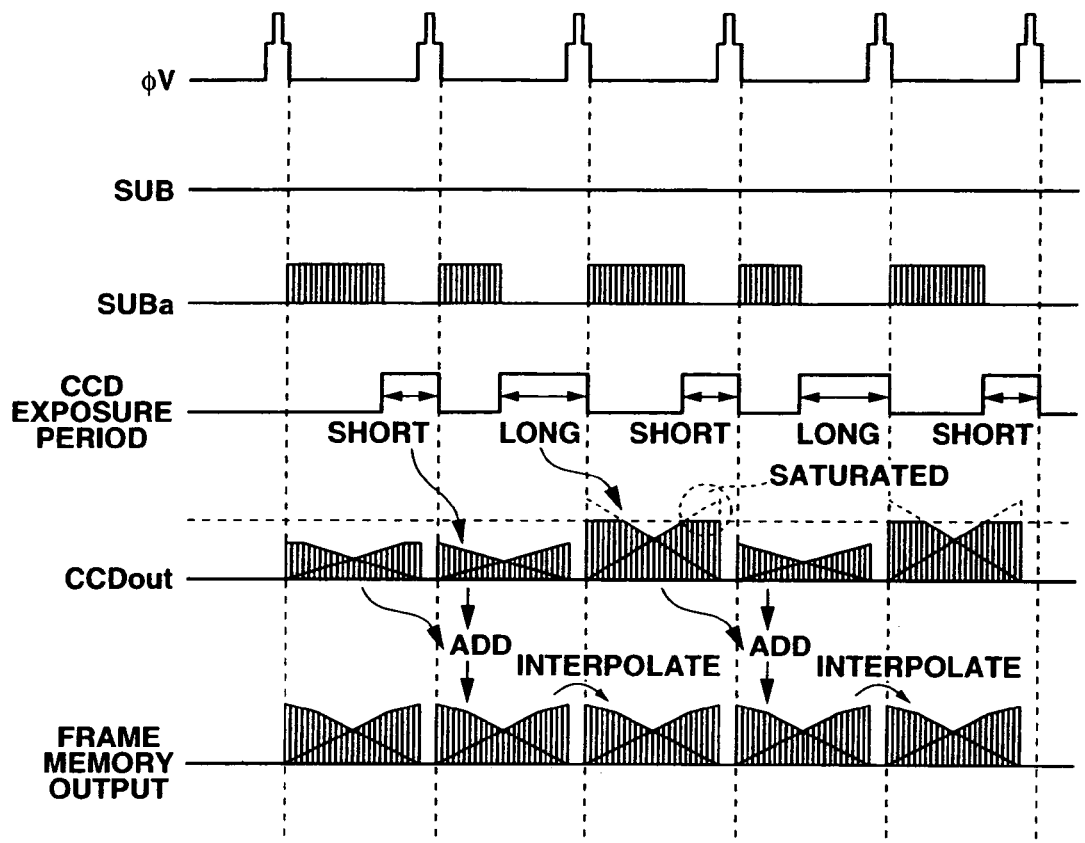

As shown in FIG. 13, because of the vertical transfer signals φV having a cycle of 1/60 sec., the exposure period is 1/60 sec., for example. Generally, though the occurrence period of the electrical shutter signals SUB during the exposure period is constant, in the dynamic range extension mode, the occurrence period of the electrical shutter signals SUBa is controlled by the control microprocessor 226 such that it is differed depending on its field. Since the exposure time of the CCD 215 during the exposure period is a time from the end to the beginning of the occurrence of the electrical shutter signals SUBa, the exposure time of the CCD 215 is varied by controlling the occurrence time of the electrical shutter signals SUBa. The exposure time is controlled by the control microprocessor 226 depending on measured light information. The measured light information of the video signals obtained from a light measurement circuit provided in the video signal corrector circuit 232 or the like, for example, is given from the DSP for video signal processing 221 to the control microprocessor 226.

The CCD 215 to which the electrical shutter signals SUBa are given outputs imaging signals CCDout at the read-out timing subsequent to the end of the exposure time corresponding to the SUBa. Thus, when the exposure time is shorter, the level of the video signal component in the imaging signals CCDout becomes lower. Conversely. when the exposure time is longer, the level of the video signal component in the imaging signals CCDout becomes higher. Here, when the level of the video signal component exceeds a predetermined level, the video signal component saturates as shown in the figure.

Figure 14:
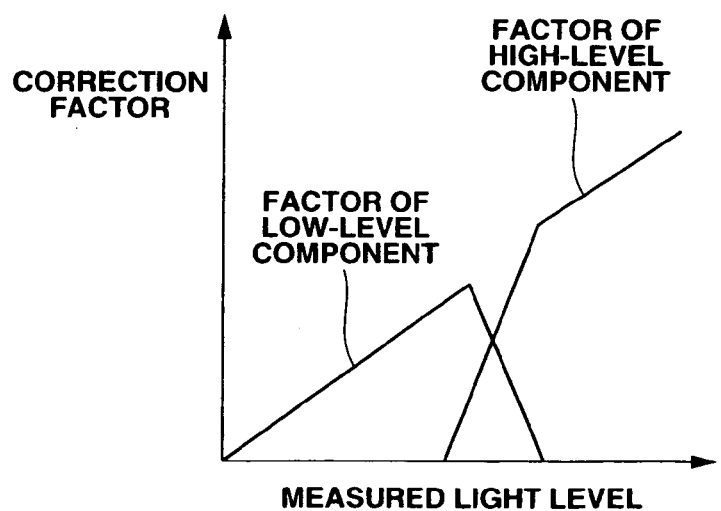

In this way, field signals, which have different signal levels alternately, for example, are stored alternately in the field memories 251 and 252. The video signals read out from each of field memories 251 and 252 are multiplied by a correction factor through the separate multipliers 271, respectively for level correction, and the video signals output from these two multipliers 272 are added in their level in an adder 273 to be given to the frame memory 274. Here, the correction factor given from the control microprocessor 226 to the multipliers 272 is controlled to be a function for the measured light level of the video signal measured in the DSP for video signal processing 221, as shown in FIG. 14. This function is a function of the correction factor for the high level component of the video signal and a function on which the correction factor for the low level component is superimposed. As shown in FIG. 13, the video signals given from the adder 273 to the frame memory are corrected in the saturated part of the video signals, to become signals which are wide in the dynamic range. The frame memory 274 interpolates the video signals output from the adder 273 and returns them to the DSP for video signal processing 221.

Through the endoscope 201 described above with reference to FIG. 10 through FIG. 14, the DSP for video signal processing 221 controls the field memories 251, 252 and the like, or the control microprocessor 226 controls the image memory circuit 225 and the drive signal timing converter circuit 222 so that special operation mode operations such as the long time exposure mode and the dynamic range extension mode can be switched without any changes in hardware.

Though in the endoscope apparatus 101, for which one example of its con figurations are shown in FIG. 10 and FIG. 11, the video processor 216 is constructed integrally with the endoscope 201, it is not limited to such a construction, and the video processor may be constructed separately from the endoscope.

By the way, it is conventionally known the endoscope, which is portably convenient by including an CCD, which is provided at the pointed end of the insert portion as an imaging means for imaging an object image, a video processor, which is provided in its operating portion for driving and controlling said CCD to obtain from imaging signals obtained in said CCD video signals that can be displayed on a monitor, and an LCD (liquid crystal display), which is provided in the operating portion as needed as a display means for picturing said video signals.

However, conventionally, in the endoscope with such a video processor, when it includes additional functions such as for superimposing date and time and an arbitrary character on the video signals, the circuit for adding the arbitrary character and the like is complicated, which causes problems of the increase in cost and size of the device.

Then, an embodiment of an endoscope having additional functions such as the functions, by which the date and time and arbitrary characters are superimposed in the video signals in the endoscope with the video processor, will be described below with reference to FIG. 16 and FIG. 17.

An endoscope 501 shown in FIG. 16 is composed of a long, narrow insert portion 502 for being inserted to within a body cavity, within a duct, or the like, an operating portion 503, which are provided in line on the base end side of the insert portion 502 for holding and operating the endoscope 501, an operating portion switch 504 provided at the operating portion 503, a remote controller 505, which is connected through a cable extended from said operating portion 503, an objective optical system 511, which is provided at the pointed end of said insert portion 502, for focusing an object image, a CCD 512 whose light receiving surface is positioned at an focusing position of said objective optical system 511 at the pointed end of said insert portion 502 for imaging the object image focused on said objective optical system 511 as an imaging means, a video processor 513, which is provided in said operating portion 503, for example, for driving and controlling said 512 to obtain from the imaging signals obtained in said CCD 512 video signals that can be displayed on a monitor, an LCD monitor 514 (LCD stands for liquid crystal display), which is provided in said operating portion 503, for picturing the video signals obtained in said video processor 513, a battery 515, which is attached removably to the operating portion 503, for example, for supplying power to each part of the endoscope 501 such as said video processor 513 and LCD monitor 514, and a battery such as a lithium battery for clock 516, which is attached removably to the operating portion 503, for example, for powering to maintain the clock functions within said video processor 516.

The video processor 513 is composed of an oscillator such as a system clock crystal oscillator for oscillating the system clock being supplied to each part of the video processor 513, a CCD drive circuit 522 for generating a drive signal for driving said CCD 512, a CDS/AGC circuit 523 for performing CDS (correlated double sampling) processing and AGC (automatic gain control) processing on the imaging signal obtained in said CCD 512 to extract a video signal component, an A/D converter circuit 524 for converting the video signal obtained in the CDS/AGC circuit 523 to a digital signal, a DSP for video signal processing 525 (DSP stands for digital signal processor) for obtaining a composite video signal and a Y/C separation video signal, which are an analog video signal that can be displayed on a monitor, for example, from the digital signal obtained in the A/D converter circuit 524, a sync circuit 526 for generating synchronously a signal to be given to each part of the video processor 513 such as said DSP for video signal processing 525, a control microprocessor 527 for transmitting information from/to said DSP for video signal processing 525 while controlling each part of the video processor 513, a ROM 528 for storing software that the control microprocessor 527 executes, a character generator 529, which is connected to said control microprocessor 527, for converting character data to pixel data, a clock IC 530 for giving information regarding date and time to said control microprocessor 530, a superimposed circuit 531 for superimposing a video signal in the middle of processing by said DSP for video signal processing 525 and pixel data given from the control microprocessor 527 and returning the video signal to said DSP for video signal processing 525, and a power supply control circuit 532, which can open a power supply line supplied from said battery 515, depending on the control from said control microprocessor 527.

As shown in FIG. 17, said DSP for video signal processing 525 a video signal corrector circuit 541 having a luminance signal corrector circuit 541a for performing correction processing and the like on a luminance signal component in the video signal obtained in said A/D converter circuit 524 and a color signal corrector circuit 541b for performing correction processing and the like on a color signal component to give the video signal to said superimposed circuit 531, a digital encoder 542 for digitally modulating and, then, D/A converting the video signal returned from said superimposed circuit 531 to obtain a composite video signal and a Y/C separation video signal, an SSG (sync signal generator circuit) 543 for generating a control signal to be given to said superimposed circuit 531 by following the sync signal given from said sync circuit 526, and a serial interface 544 for transmitting information to said control microprocessor 527.

The superimposed circuit 531 is composed of a latch circuit 551 for latching a video signal in form of 16 bit "Y:U:V=4:2:2", for example, given from said DSP for video signal processing, a frame memory 552 for temporally storing the 16 bit video signal, for example, output from the latch circuit 551, a video display processor 553, to which a pixel signal and the like from said control microprocessor 527 are given and which generates a 24 bit RGB video signal, for example, a color difference converting circuit 554 for performing color difference conversion processing on the 24 bit RGB video signal, for example, obtained in the video display processor 553 to obtain a video signal in form of 16 bit "Y:U:V=4:2:2", and a digital selector 555, which is controlled by said video display processor 553, for superimposing the video signal from said frame memory 552 and the video signal from said color difference converter circuit 554 and returning the video signals to said DSP for video signal processing 525.

Next, effect of the endoscope 501 will be described, which describes its configuration with reference to FIG. 16 and FIG. 17.

The CCD 512 driven by the drive signals from the CCD drive circuit 522 gives imaging signals corresponding to a object image to the CDS/AGC circuit 523. The CDS/AGC circuit 523 extracts a video signal component from the given imaging signals and gives it to the A/D converter circuit 524. The A/D converter circuit 524 converts the given video signal to a digital signal and gives it to the DSP for video signal processing 525. In the DSP for video signal processing 525 the video signal corrector circuit 541 performs correction processing and the like on the given video signal and gives the video signal inform of "Y:U:V=4:2:2", for example, to the superimposed circuit 531. In the superimposed circuit 531, the given video signal is synchronized in the latch circuit 551, temporally stored in the frame memory 552, and given to the digital selector 555.

On the other hand, the control microprocessor 527 obtains information of date and time from the clock IC 530. Then, the control microprocessor 527 converts character information indicating the date and time to pixel information in the character generator 529 and gives it to the video display processor 553 in the superimposed circuit 531. Here, the correction of the date and time of the clock IC 530 is done by the operation input from the operating portion switch 504 or the remote controller 505. Also, the control microprocessor 527 can obtain arbitrary character information from the operating portion switch 504 or the remote controller 505. Then, the control microprocessor 527 converts the arbitrary character information to pixel information in the character generator 529 and gives it to the video display processor. The pixel information corresponding to the characters indicating date and time and arbitrary characters is converted to the video signal in the RGB form by the video display processor 553. The video signal in the RGB form is converted to the video signal in form of "Y:U:V=4:2:2", for example and given to the digital selector.

Then, the digital selector 555 superimposes the video signal from the color difference converter circuit 554 on the video signal from the from memory 552 and returns the video signal in form of "Y:U:V=4:2:2" to the DSP for video signal processing 525. The superimposed video signal is converted to a composite video signal, for example, that can be displayed on a monitor in the digital encoder 542 in the DSP 525 to be output. Also, the composite video signal is given to the LCD monitor 514, and a picture in which characters indicating date and time and arbitrary characters are superimposed on an object image is displayed.

Further, when the time given from the clock IC 530 is at a predetermined time, the control microprocessor 527 controls the power supply control circuit 532, by which the power supplied from the battery 515 to each part of the endoscope 501 is turned off.

According to the endoscope 501 described above with reference to FIG. 16 and FIG. 17, the superimposed circuit 531, the control microprocessor 527, the clock IC 530, the operating portion switch 504 and the character generator 529 are provided within the endoscope 501 so that view of the date and time and the view of the arbitrary characters can be superposed on the object image and displayed without having an external device.

Further, in this embodiment, superimposing or non-superimposing said video signal can be selected even during the freeze-frame display of an endoscope image or successive reading-out operation from the frame memory 552 through long time exposure condition by superimposing the video signal including date and time, arbitrary characters and arbitrary figures on the video signal in the middle of the processing in the DSP for video signal processing 525 in the rear stage of the frame memory 552, which enhances its operability. Furthermore, as shown in FIG. 17, since addresses in the frame memory 552 are configured to be address controlled at the DSP 525, an address controller circuit, which is conventionally provided separately is not needed, which can reduce the number of parts and achieve the small, inexpensive construction.

In the embodiment above, since the output of the digital selector 555 in FIG. 17 (the output of the superimposed circuit 531 in FIG. 18) is output to the outside, digital video signals of endoscope images in which information such as characters is superimposed can be output easily so that it can be used in the outside.

Also, in this embodiment, Y:U:V (luminance Y, color difference R-Y/B-Y) can be generated directly by the video display processor 553 in FIG. 17. In that case, it is possible that the color difference converting circuit 554 becomes unnecessary.

Also, in this embodiment, when the RGB signal is caused to be output from the cideo signal corrector circuit 541 in the DSP 525, the superimposed circuit can be configured with the one that can be processed by the RGB signal.

Further, in this embodiment, since the control microprocessor 527 in FIG. 16 can communicate with the outside through RS232C, a function that is set through the operating portion switch 504 and a function that is set through the remote controller 505 by a user can be controlled and operated from the external personal computer.

Furthermore, through the microprocessor 527, it is possible to operate an electric angle for adjusting the angle of the pointed end part of the insert portion, not shown, to set the time of the clock, to set the content which should be superimposed and displayed on the endoscope image, or to set all of the DSP 525, such as color adjustment, white balance adjustment, CCD drive pulse timing adjustment, signal line length timing adjustment, gamma correction, enhanced adjustment, electric shutter exposure time setting, and exposure time setting in long time exposure. Thus, in this embodiment, since all of setting, operation and adjustment of the whole exdoscope device, including all of these setting of the DSP 525, is possible via the RS232C from the external personal computer, it is possible to construct an electric endoscope system with higher operability and system extensibility by connecting it to the external personal computer or the like.

Also, since the clock IC 530 is provided, and the power supply control circuit 532 is provided which can turn off the power supplied from the battery 515 under the control of the control microprocessor 527, it is possible to be controlled to turn off the power supply at a predetermined time automatically.

Also, since the lithium battery for clock is provided which is power supply for the clock IC 530, clock IC 530 can always update the time even during the power, that is supplied from the battery 515 to each part of the endoscope 501, is turned off.

In the present invention, it is apparent that the embodiments differed in wide ranges can be configured based on the present invention, not departing from the spirit and the scope of the present invention. The present invention is solely limited by the appended claims and is not limited by specific embodiments.

What is claimed:

1. An endoscope apparatus, comprising:
   an imaging device for imaging an object image;
   a drive signal generator portion for generating a drive signal to drive the imaging device;
   a video signal extracting portion for extracting a video signal from an imaging signal obtained by the imaging device;
   an A/D converter portion for converting the video signal extracted by the video signal extracting portion to a digital signal;
   a control portion which operationally controls at least one of a first mode and a second mode, the first mode being a normal exposure mode and a long time exposure mode and the second mode being a normal dynamic range mode and a dynamic range extension mode;
   a drive signal timing converter portion capable of converting timing of the drive signal supplied to the imaging device in response to controls provided by the control portion;
   a memory for at least temporarily storing the video signal while the video signal is processed; and
   a memory control signal generator portion for generating a control signal which controls the operation of the memory in response to the controlling provided by the control portion.

2. An endoscope apparatus according to claim 1, wherein the control portion controls the normal exposure mode and the long time exposure mode, and
   the drive signal timing converter portion includes a read-out pulse timing converter portion in which timing of vertical transfer signals among drive signals is converted and timing of other drive signals is not converted.

3. An endoscope apparatus according to claim 2,
   wherein the memory includes a set of field memories and a frame memory, the memory serving to interpolate given video signals by the set field memories and the frame memory when the control portion operates the long time exposure mode.

4. An endoscope apparatus according to claim 1,
wherein the control portion controls the normal dynamic range mode and the dynamic range extension mode, and
the drive signal timing converter portion converts timing of electrical shutter signals for controlling an electrical shutter function of the imaging device among drive signals and does not convert timing of other drive signals in the dynamic range extension mode.

5. An endoscope apparatus according to claim 4,
wherein the memory includes a set of field memories, an operation processing portion, and a field memory.

6. An endoscope apparatus according to claim 5,
wherein the operation processing portion includes two multipliers through which video signals read out from the set of field memories are multiplied by a correction factor provided by the control portion respectively and an adder in which the video signals output from the two multipliers are added.

7. An endoscope apparatus according to claim 6,
wherein the correction factor given from the control portion is controlled to be a function for the measured level of the video signal.

8. An endoscope apparatus according to claim 7,
wherein the function is the one having a function of the correction factor for the high level component of the video signal and a function of the correction factor for the low level component superimposed.

9. An endoscope apparatus comprising:
imaging means for imaging an object image;
drive signal generator means for generating a drive signal to drive the imaging means;
video signal extracting means for extracting a video signal from an imaging signal obtained by the imaging means;
an A/D converter circuit for converting the video signal extracted by the video signal extracting means to a digital signal;
control means capable of operationally controlling at least one of a first mode and a second mode, the first mode being a normal exposure mode and a long time exposure mode and the second mode being a normal dynamic range mode and a dynamic range extension mode;
drive signal timing converter means capable of converting timing of the drive signal supplied to the imaging means in response to controls by the control means;
a memory for at least temporarily storing the video signal while the video signal is processed; and
memory control signal generator means for generating a control signal which controls the operation of the memory in response to the controlling provided by the control means.

10. An endoscope apparatus comprising:
an imaging device for imaging an object image;
a drive signal generator portion for generating a drive signal to drive the imaging device;
a video signal extracting portion for extracting a video signal from an imaging signal obtained by the imaging device;
an A/D converter portion for converting the video signal extracted by the video signal extracting portion to a digital signal;
a control portion capable of operationally controlling a first mode and a second mode, the first mode being a normal exposure mode and a long time exposure mode and the second mode being a normal dynamic range mode and a dynamic range extension mode;
a drive signal timing converter portion capable of converting timing of the drive signal supplied to the imaging device in response to controlling by the control portion;
a memory for at least temporarily storing the video signal while the video signal is processed; and
a memory control signal generator portion for generating a control signal which controls the operation of the memory in response to the controlling by the control portion.

* * * * *